US 11,491,905 B2

(12) United States Patent
Kibler

(10) Patent No.: US 11,491,905 B2
(45) Date of Patent: *Nov. 8, 2022

(54) PNEUMATIC TANK WITH TENSION BAR

(71) Applicant: MAC TRAILER MANUFACTURING, INC., Alliance, OH (US)

(72) Inventor: Scott A. Kibler, Kensington, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 612 days.

This patent is subject to a terminal disclaimer.

(21) Appl. No.: 16/141,218

(22) Filed: Sep. 25, 2018

(65) Prior Publication Data
US 2019/0023172 A1   Jan. 24, 2019

Related U.S. Application Data

(63) Continuation of application No. 15/056,496, filed on Feb. 29, 2016, now Pat. No. 10,155,466.

(51) Int. Cl.
  *B60P 3/24* (2006.01)
  *B60P 3/22* (2006.01)
(52) U.S. Cl.
  CPC ............. *B60P 3/24* (2013.01); *B60P 3/2205* (2013.01)
(58) Field of Classification Search
  CPC ....... B60P 3/221; B60P 3/2205; B60P 3/2225; B60P 3/2215; B60P 3/2235; B60P 3/243; B60P 3/24; B65D 90/0006
  USPC ........... 280/832, 837, 839; 220/564; D12/95
  See application file for complete search history.

(56) References Cited

U.S. PATENT DOCUMENTS

| 2,616,758 | A |   | 11/1952 | Meyers |
| 2,901,133 | A | * | 8/1959 | Weller ............. B60P 3/24 406/119 |
| 3,043,599 | A |   | 7/1962 | Meyer |
| 3,058,753 | A |   | 10/1962 | Carlsen |
| 3,080,173 | A |   | 3/1963 | Johnson et al. |
| D196,427 | S |   | 10/1963 | Anderson |
| D204,751 | S |   | 5/1966 | Mendez |
| D211,163 | S |   | 5/1968 | Mendez |
| 3,543,692 | A |   | 12/1970 | Stark |
| D229,041 | S |   | 11/1973 | Norton |
| 4,230,048 | A |   | 10/1980 | Gordon et al. |
| 4,346,905 | A |   | 8/1982 | Smetanick |
| 4,818,024 | A |   | 4/1989 | Michel |
| 5,819,970 | A |   | 10/1998 | Solimar |
| 6,457,630 | B1 |  | 10/2002 | Nilsson |
| 8,684,448 | B2 |  | 4/2014 | Johnson et al. |
| 9,308,852 | B2 |  | 4/2016 | Kibler |
| D756,267 | S |   | 5/2016 | Kibler et al. |
| 9,758,083 | B1 |  | 9/2017 | Beelman, III et al. |
| 9,789,916 | B1 |  | 10/2017 | Beelman, III et al. |

(Continued)

OTHER PUBLICATIONS

Pneumatic Dry Bulk Tank—Trailer, www.flicker.com, https://www.flickr.com/photos/77979851@N05/8132184963, Oct. 28, 2012, 3 pages.

(Continued)

*Primary Examiner* — Anne Marie M Boehler
(74) *Attorney, Agent, or Firm* — Sand, Sebolt & Wernow Co., LPA

(57) ABSTRACT

A tank trailer may include a plurality of hoppers and a tension bar assembly extending between the hoppers.

16 Claims, 16 Drawing Sheets

(56) References Cited

U.S. PATENT DOCUMENTS

| | | | |
|---|---|---|---|
| 10,155,466 B2 * | 12/2018 | Kibler | ............ B60P 3/2205 |
| 2008/0073895 A1 * | 3/2008 | Herman | ............ B60P 3/2245 |
| | | | 280/839 |
| 2009/0085394 A1 | 4/2009 | Lemmons | |
| 2013/0266411 A1 | 10/2013 | Morgan et al. | |
| 2014/0353999 A1 | 12/2014 | Yielding | |
| 2015/0061318 A1 | 3/2015 | Kibler et al. | |
| 2015/0137501 A1 | 5/2015 | Kibler et al. | |
| 2017/0247182 A1 | 8/2017 | Kibler | |

OTHER PUBLICATIONS

Bulktransporter.com. "AeroMAC—1615—food grade, monocoque frameless design. Photos: NTTC Tank Truck Week 2015." Uploaded Nov. 23, 2015. Retrieved Mar. 29, 2017. (http://bulktransporter.com/cargo-tankstrailers/photos-nttc-tank-truck-week-2015#slide-19-field_images-39991).

\* cited by examiner

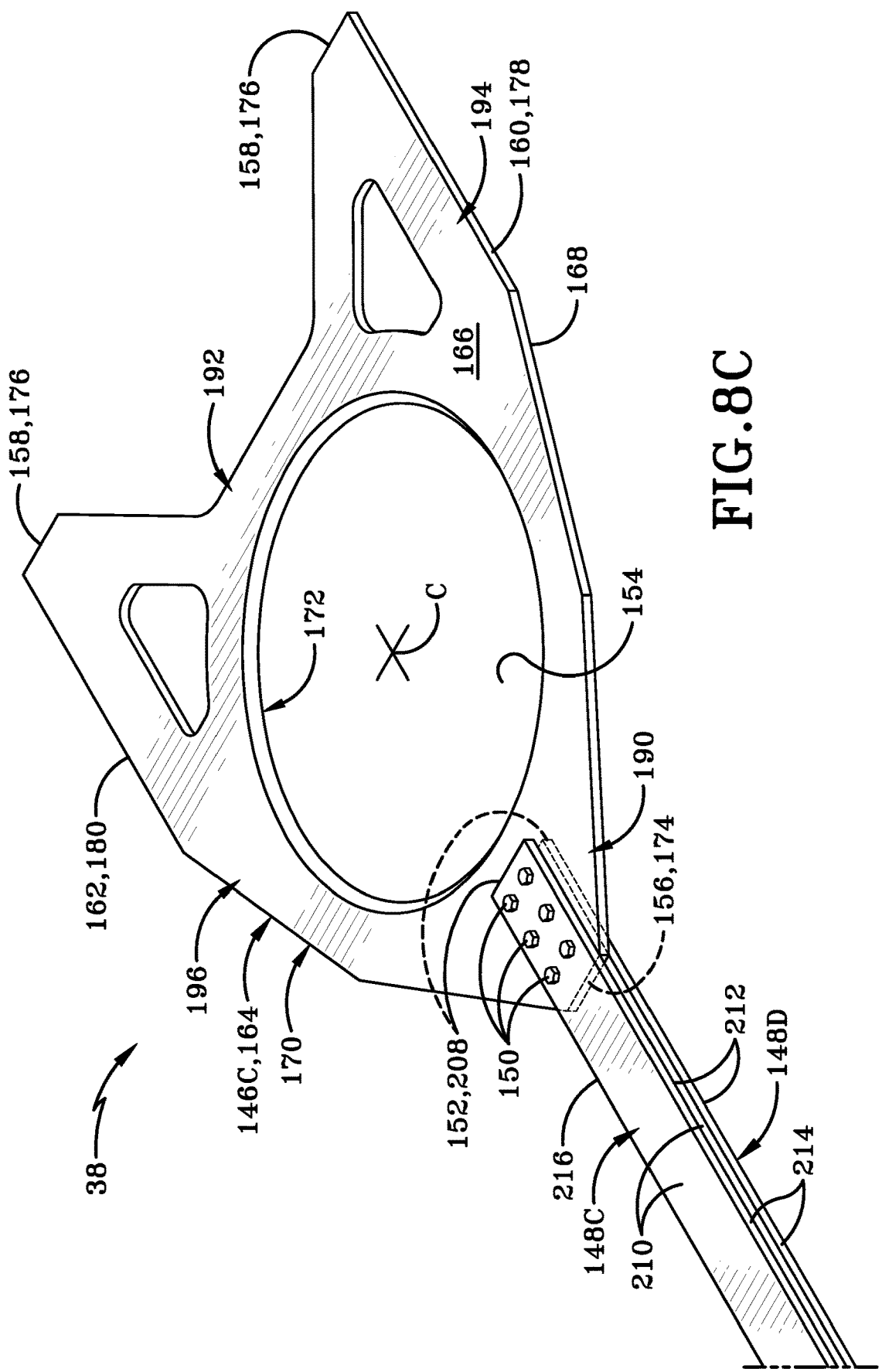

PNEUMATIC TANK WITH TENSION BAR

CROSS REFERENCE TO RELATED APPLICATION

This application is a continuation of U.S. patent application Ser. No. 15/056,496, filed Feb. 29, 2016; the disclosure of which is incorporated herein by reference.

BACKGROUND

1. Technical Field

The technical field is related generally to bulk tankers or bulk or pneumatic tanks/trailers having a plurality of hoppers. More particularly, the technical field is related to such a tank or trailer having a tension bar extending between a pair of the hoppers.

2. Background Information

Bulk tankers and bulk tank trailers or pneumatic tank trailers are amongst the many types of vehicles used for hauling materials over highways and the like. They typically have several hoppers or cones which facilitate the discharge of the bulk material from within the tank into a discharge line through which air is pumped to discharge the material to a rear end of the trailer. Valve assemblies are typically located at the bottom of the hoppers whereby the hoppers may be opened or closed to respectively allow the flow of the bulk particulate material from the hoppers into the discharge pipe and to cut off this flow. Such tankers or trailers typically include a relatively substantial or large frame on which the tank/hoppers are mounted. Such frames are relatively heavy, which for instance may decrease gas mileage or reduce the amount of cargo which may be carried in the tank while staying within government weight regulations.

SUMMARY

In one aspect, a tank trailer may comprise a trailer front end and a trailer back end defining therebetween a longitudinal direction; a first hopper; a second hopper which is rearward of the first hopper; and a tension bar assembly which extends between and is secured to the first and second hoppers, and which comprises a longitudinally elongated first tension bar extending from adjacent the first hopper to adjacent the second hopper.

In another aspect, a tank trailer may comprise a first hopper; a second hopper which is rearward of the first hopper; a third hopper which is rearward of the second hopper; a first flange which is secured to and extends outward from the first hopper; a second flange which is secured to and extends outward from the second hopper; a third flange which is secured to and extends outward from the third hopper; a first tension bar extending between and secured to first and second flanges; and a second tension bar extending between and secured to second and third flanges.

BRIEF DESCRIPTION OF THE SEVERAL VIEWS OF THE DRAWINGS

One or more sample embodiments is set forth in the following description, shown in the drawings and particularly and distinctly pointed out and set forth in the appended claims.

FIG. 8C is an enlarged perspective view of a rear portion of the tension bar assembly including the rear flange and a rear portion of rear upper and lower tension bars.

Similar numbers refer to similar parts throughout the drawings.

DESCRIPTION

Figure 1:
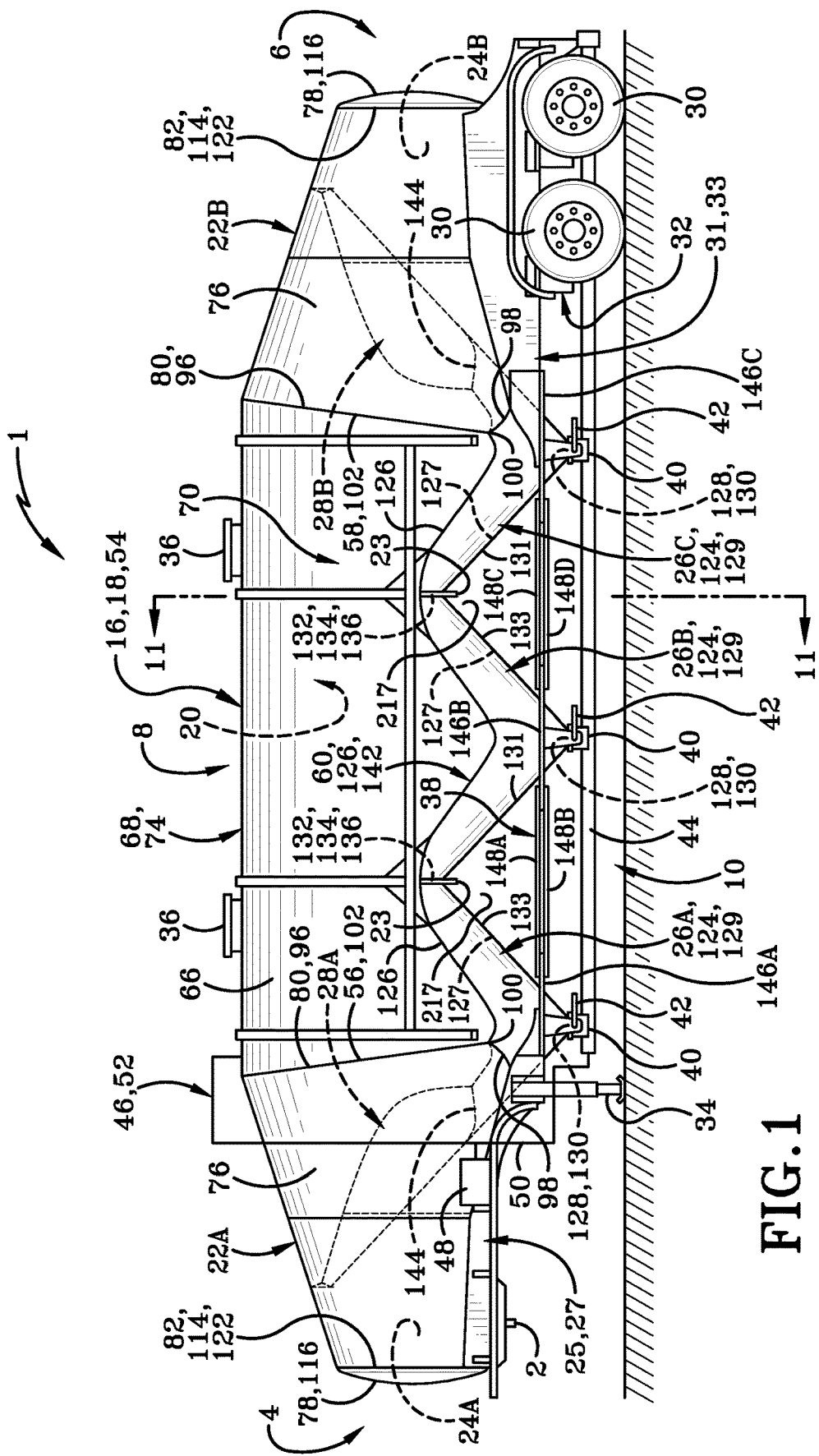
FIG. 1 is a left side elevation view of a pneumatic tank trailer showing a piping assembly and air pump diagrammatically.

A bulk tank trailer or pneumatic tank trailer is shown generally at 1 in FIG. 1. Trailer 1 may be a towed vehicle which is towed by a towing vehicle such as an on-road tractor (not shown) whereby trailer 1 and the tractor may form a tractor trailer rig in the form of a bulk tanker. The front of trailer 1 may be pivotally hitched to the rear of tractor via a hitch such as a fifth wheel hitch or the like comprising a hitch member 2 of the trailer. Trailer 1 has a front 4 and a back 6 defining therebetween a longitudinal direction. Trailer 1 further has a top 8, a bottom 10 and left and right sides 12 and 14 (FIG. 2) defining therebetween an axial direction.

For clarity, an explanation of some terms used herein is provided. Trailer 1 may have an imaginary axial center line CL (FIGS. 5, 6) or center plane which may be a vertical longitudinally extending plane cutting through the center of the trailer midway between the left and right sides thereof. As is readily evident from the Figures, various components are axially offset or spaced from the center plane. The description of trailer 1 may make reference to certain components, sides, surfaces, points and the like as being inboard or outboard of one another, or this may be readily apparent from the Figures even without specific description. Such terms typically relate to the left or right halves of the trailer whereby, for instance, with regard to the left half (left of central plane CL), a first point which is outboard of a second point is further to the left than the second point or further outboard than the second point in a first or left outboard direction, and thus the second point is inboard of or to the right of the first point. Thus, within the left half, the first point is further outboard or further from the center plane than is the second point. Likewise, with regard to the right half (right of central plane CL), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from the center plane than is the fourth point.

Various surfaces may be said to face axially inward or axially outward, which may respectively mean facing generally toward or away from center line/plane CL. Thus, on the left half of trailer 1, a surface which faces axially inward may be said to face generally to the right or rightward, and a surface which faces axially outward may be said to face generally to the left or leftward. On the right half of trailer 1, a surface which faces axially inward may be said to face generally to the left or leftward, and a surface which faces axially outward may be said to face generally to the right or rightward.

Similarly, various components, surfaces etc. may be said to extend axially inward or axially outward, which may respectively mean extending generally toward or away from center line/plane CL. Thus, on the left half of trailer 1, a component etc. which extends axially inward may be said to extend generally to the right or rightward, and a component, etc. which extends axially outward may be said to extend generally to the left or leftward. On the right half of trailer 1, a component, etc. which extends axially inward may be said to extend generally to the left or leftward, and a component etc. which extends axially outward may be said to extend generally to the right or rightward.

Further explanation is provided with respect to references to the longitudinal direction of trailer 1. Certain components of trailer 1 are further forward or rearward of other components, or may be at the same location along the longitudinal axis. Thus, for example, a reference to two points, surfaces, components or the like being "at the same longitudinal position" or "at the same longitudinal location" means that the two points, surfaces, components or the like are at the same position along the longitudinal axis while they may be at different axial positions, that is, spaced to the left or right of one another, or spaced upwardly or downwardly of one another. Similarly, a reference to two points, surfaces, components or the like being "longitudinally adjacent" one another means that the two points, surfaces, components or the like are at or adjacent the same position along the longitudinal axis while they may be at different axial positions or spaced upwardly or downwardly of one another. It is also noted that the term U-shaped or U-shaped configuration may be used herein to mean an upright U-shape or U-shaped configuration and the term inverted U-shaped configuration may be used herein to mean an upside down U-shaped configuration.

With primary reference to FIG. 1, trailer 1 may have a rigid trailer frame or structure or bulk tank assembly 16 which may include a bulk tank 18 defining an interior bulk storage chamber 20; a front end housing 22A defining a front end housing interior chamber 24A; a rear end housing 22B defining a rear end housing interior chamber 24B; several hoppers or cones 26, for example, three hoppers 26A-C; ribs 23; and front and rear slide plate assemblies 28A and 28B. Assembly 16 including tank 18, end housings 22, hoppers 26, ribs 23 and slide plate assemblies 28 may be formed primarily of a metal, for instance, an aluminum alloy or other suitable metal. Bulk tank 18, end housings 22, hoppers 26, and slide plate assemblies 28 and other aspects of trailer 1 are described in greater detail in U.S. patent application Ser. No. 15/056,237, now U.S. Pat. No. 9,802,753, issued Oct. 31, 2017 and entitled "Pneumatic Tank Having Forward and Rearward Tangential Joint Lines" by the same inventor filed on the same date as the present application. U.S. patent application Ser. No. 15/056,237 is incorporated herein by reference.

Left and right sets of ground engaging wheels 30 may be rotatably mounted on frame/assembly 16 about respective horizontal axially extending axes via a suitable suspension assembly 32 which may be secured to rear end housing 22B and extend downward therefrom adjacent back or back end 6. Trailer 1 may include landing gear 34 generally adjacent front or front end 4. Landing gear 34 may be any suitable type known in the art and be configured to move between a lowered position in contact with the ground for supporting the front of trailer 1 when disconnected from the tractor or other towing vehicle and a raised position out of contact with the ground when trailer 1 is hitched to the tractor/towing vehicle for over the road travel.

Tank assembly 16 may include a front frame 25, which may be referred to as a hitch mounting frame (for mounting hitch member 2 thereon), a landing gear mounting frame (for mounting landing gear 34 thereon) or a hitch and landing gear mounting frame (for mounting hitch member 2 and landing gear 34 thereon). Frame 25 may include may be a rigid structure and may be formed primarily of an aluminum alloy or other suitable metal. Frame 25 may include various components including a front left rail 27 and a front right rail 29. Frame 25 may be rigidly secured to and extend downward from a lower portion of front end housing 22A and a lower front portion of front hopper 26A. Tank assembly 16 and suspension assembly 32 may include a rear/suspension frame 31, which may be referred to as a wheel mounting frame on which wheels 30 are rotatably mounted. Frame 31 may include may be a rigid structure and may be formed primarily of an aluminum alloy or other suitable metal. Frame 31 may include various components including a rear left rail 33 and a rear right rail 35. Frame 31 may be rigidly secured to and extend downward from a lower portion of rear end housing 22B and a lower rear portion rear hopper 26C.

Bulk storage chamber 20 may be configured for carrying therein dry particulate material bulk. Such material may be, for example, sand, plastic beads or pellets, or any other solid particulate material typically carried in bulk tank trailers, which may include food grade material. Interior chambers 24A and 24B may be separate from and respectively directly in front of and directly behind interior chamber 20. Hopper 26A may be the frontmost hopper and hopper 26C may be the rearmost hopper with hopper 26B directly therebetween. Hopper 26B may be directly behind hopper 26A, while hopper 26C may be directly behind hoppers 26A and B. Trailer 1 may also be configured with two or four hoppers, and possibly more. Center plane CL may cut through the axial center of each of hoppers 26 midway between the left and right sides thereof. A plurality of hopper feed ports 36 including openable and closable lids may be mounted on top of tank 18 above hoppers 26. Ports 36 may be opened in order to receive the bulk particulate material therethrough to fill chamber 20 to a desired level. The lids of the ports may be closed to secure the particulate material therein and keep moisture and other material out of interior chamber 20 and to provide a generally airtight seal. A tension bar assembly 38 may extend between and be secured to hoppers 26A and 26B adjacent lower ends thereof, and may extend between and be secured to hoppers 26B and 26C adjacent lower ends thereof.

A valve assembly 40 may be secured to the bottom of each hopper 26 and may include a valve which is operated by a control handle 42 so that the handle and valve may be rotatably movable between an open position and a closed position for respectively opening communication between and closing communication between interior chamber 20 and a discharge pipe 44 of an air piping assembly 46, which may be connected to an air/pneumatic pump or compressor 48 which may be mounted on the towing vehicle or tractor or elsewhere. Pump 48 is shown here on or adjacent trailer 1 and may be upstream of piping assembly 46 and interior chamber 20. Pump 48 and air piping assembly 46 may be used to facilitate the discharge of the particulate material from within interior chamber 20 through a rear end of discharge pipe 44 adjacent the rear end 6 of trailer 1. Piping assembly 46 is shown diagrammatically in part for simplicity and given that such piping is known in the art. In addition to discharge pipe 44, air piping assembly 46 may include several air pipes including an air inlet pipe 50 and a blow down pipe 52, such that the various pipes may be in fluid communication with one another and pump 48 when assembly 46 is connected to pump 48. Assembly 46 typically includes several valves (not shown) which are used to control the flow of air through the various pipes of assembly 46. Air inlet pipe 50 may have a front inlet end configured to receive air there through to be pumped from pump 48 through the remainder of assembly 46, including an exit end of pipe 50 which may be connected to an inlet of discharge pipe 44 so that air may also be pumped from the front to the back of pipe 44. Blow down pipe 52 may have an exit end connected to tank 18 adjacent the top thereof whereby blow down pipe 52 is in direct fluid communication with chamber 20. Pump 48 may thus also pump air downstream through pipe 52 into chamber 20 to facilitate pneumatically forcing particulate material in chamber 20 out of bottom exit openings of hoppers 26 through valves 40 when open into discharge pipe 44.

Figure 2:
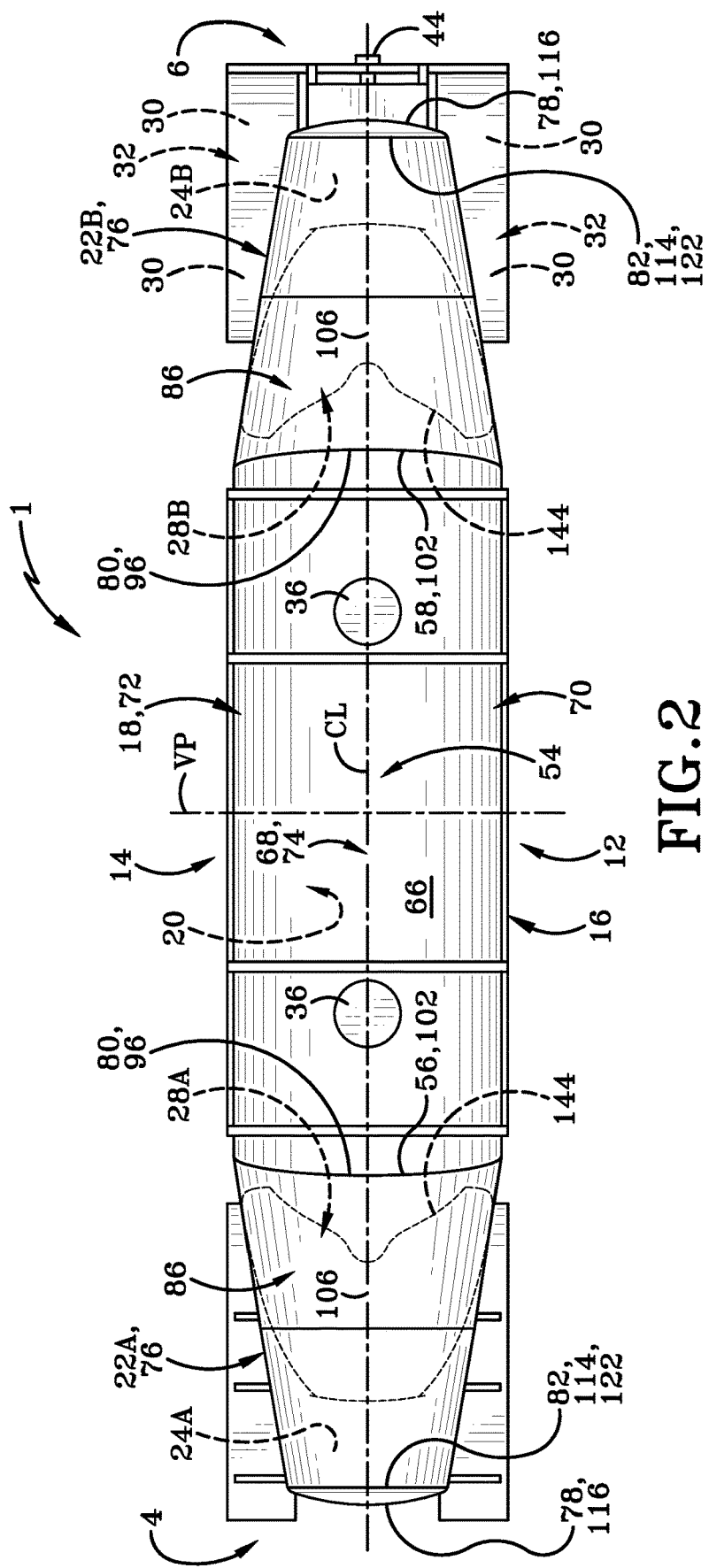
FIG. 2 is a top plan view of the trailer.
Figure 3:
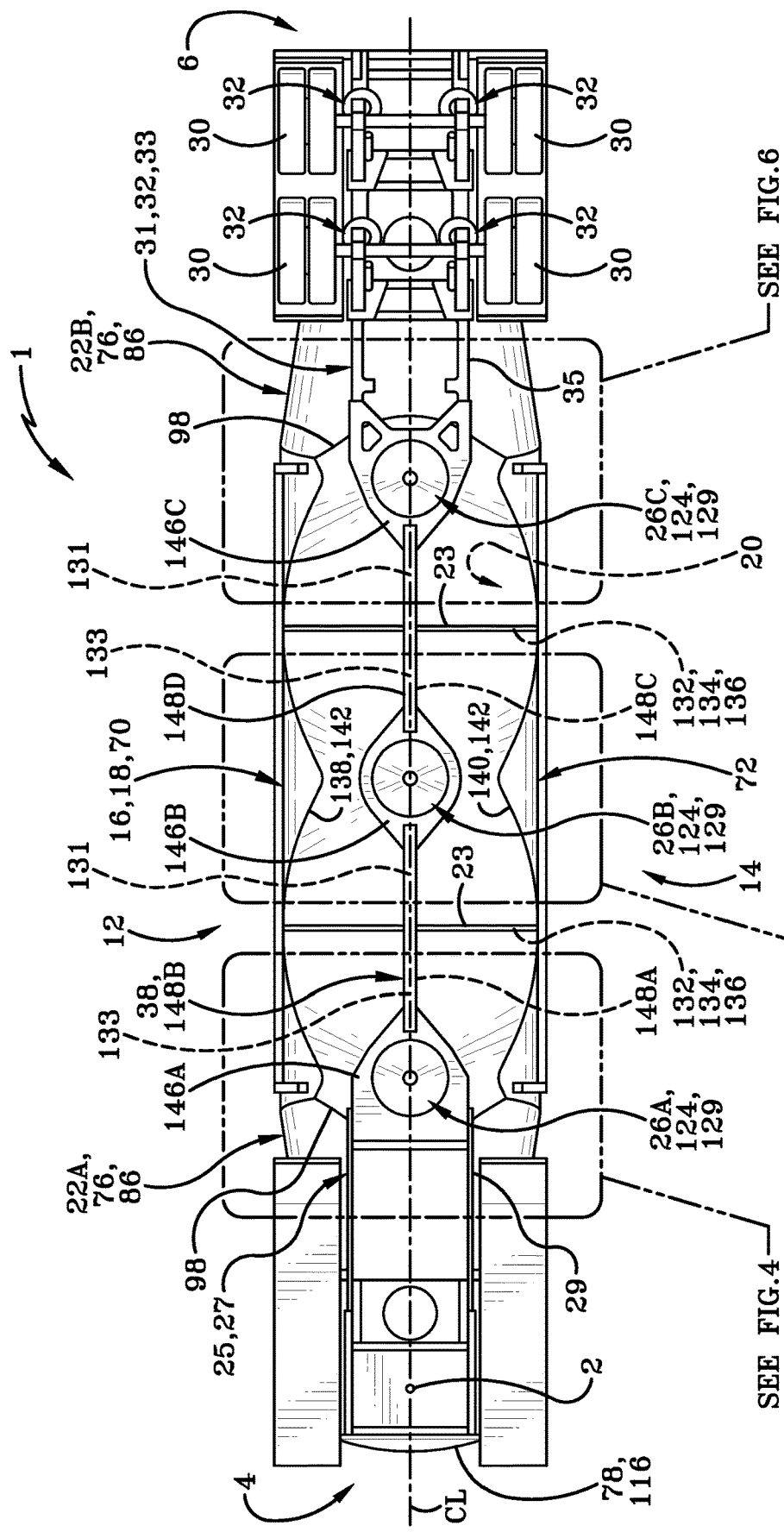
FIG. 3 is a bottom plan view of the trailer with various components such as piping and valves removed to provide a bottom plan view of the tension bar assembly.

With primary reference to FIGS. 1-3, storage tank 18 is now described. Storage tank 18 may have a central section which may include hoppers 26 and a top wall 54 which may have a generally inverted U-shaped configuration or cross section. Top wall 54 may be formed of an aluminum alloy or other suitable metal. Top wall 54 may have a front edge 56, a back edge 58, a left side bottom edge 60, a right side bottom edge 62, an inner surface 64 which faces and partially defines interior chamber 20 and an outer surface 66 which faces away from chamber 20 and serves as part of the outer surface of tank 18. Front and back edges 56 and 58 may serve as the front and back of the central section of trailer 1. Top wall 54 may have a top section 68, a left section 70 rigidly secured to and extending downwardly from the left side of top section 68, and a right section 72 rigidly secured to and extending downwardly from the right side of top section 68 such that left and right sections 70 and 72 respectively define left and right side bottom edges 60 and 62. Top wall 54 may have a longitudinally elongated peak 74 defined by top section 68 adjacent top 8 of trailer 1. Peak 74 may be essentially or generally horizontal as viewed from the side of the trailer from adjacent front edge 56 to adjacent back edge 58. Peak 74 may be defined by the intersection of outer surface 66 and center plane CL. Front edge 56 may have an inverted U-shaped configuration as viewed from the front. Similarly, back edge 58 may have an inverted U-shaped configuration as viewed from the back. Each of front and back edges 56 and 58 may be straight as viewed from the side and may lie entirely along a respective upwardly extending plane which may extend axially across trailer 1. Left side bottom edge 60 at a front end thereof may intersect the bottom left end of front edge 56 and extend rearwardly therefrom to a rear end of bottom edge 60, which may intersect the bottom left end of back edge 58. Similarly, right side bottom edge 62 at a front end thereof may intersect the bottom right end of front edge 56 and extend rearwardly therefrom to a rear end of bottom edge 62, which may intersect the right bottom end of rear edge 58. Each of side edges 60 and 62 may extend up and down in a serpentine manner from front to rear as viewed from the side. Outer surface 66 may be convexly curved in a continuous fashion as viewed from the front or rear from bottom edge 60 to bottom edge 62. Similarly, inner surface 64 may be concavely curved in a continuous fashion as viewed from the front or rear from bottom edge 60 to bottom edge 62.

Each end housing 22A and 22B may have an end housing sidewall 76 and a cap wall 78 which may be rigidly secured to sidewall 76. Each of sidewall 76 and cap wall 78 may be formed of an aluminum alloy or other suitable metal. It is noted here that tank 18 and various components including the end housings 22, hoppers 26 and slide plate assemblies 28 may be bilaterally symmetrical about an imaginary vertical axially extending plane VP (FIG. 2) which may be perpendicular to plane CL and may cut through a longitudinal center of tank 18 midway between the front and rear ends thereof, which may be represented by the front and rear ends of end housings 22A and 22B/cap walls 78 thereof. Thus, end housing 22A may be essentially a mirror image of end housing 22B, hopper 26A may be essentially a mirror image of hopper 26C, slide plate assembly 28A may be essentially a mirror image of slide plate assembly 28B, the front half of hopper 26B may be essentially a mirror image of the back half of hopper 26B and the front half of tank 18 may be essentially a mirror image of the back half of tank 18. It is also noted that tank 18 and various components including the end housings 22, hoppers 26 and slide plate assemblies 28 may be bilaterally symmetrical about central plane CL. Thus, the left half of a given end housing 22 may be essentially a mirror image of the right half of the given end housing 22, the left half or a given hopper 26 may be essentially a mirror image of the right half of the given hopper 26, the left half of a given slide plate assembly 28 may be essentially a mirror image of the right half of the given slide plate assembly 28, and the left half of tank 18 may be essentially a mirror image of the right half of tank 18. The description of components forward of plane VP may thus be similar to that of components rearward of plane VP although various aspects may be in reverse, as will be understood from the Figures.

Figure 4:
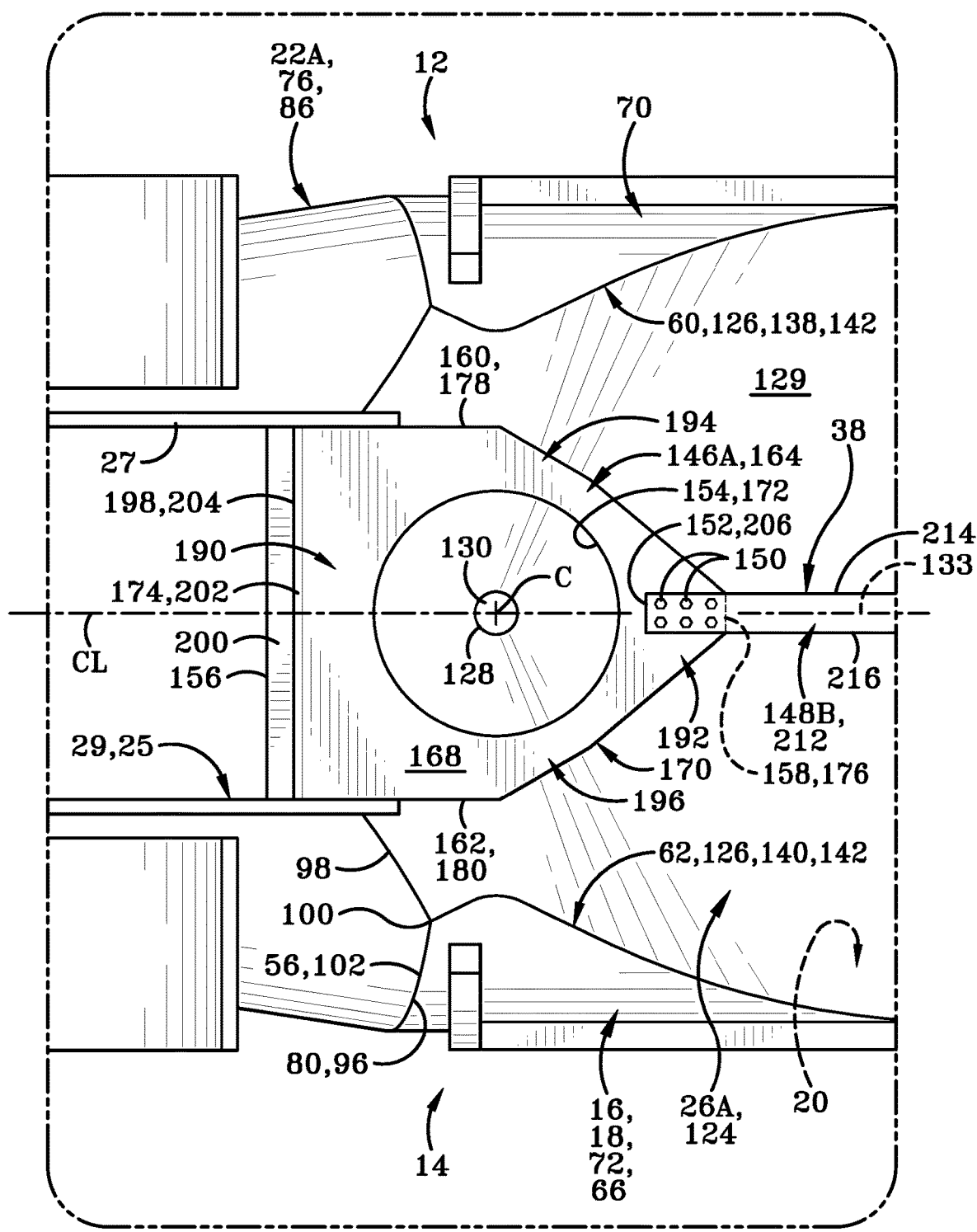
FIG. 4 an enlarged view of the encircled portion marked "See FIG. 4" in FIG. 3 showing part of the front end housing, part of the front hopper and a front portion of the tension bar assembly including the front flange and a front portion of a front tension bar.
Figure 5:
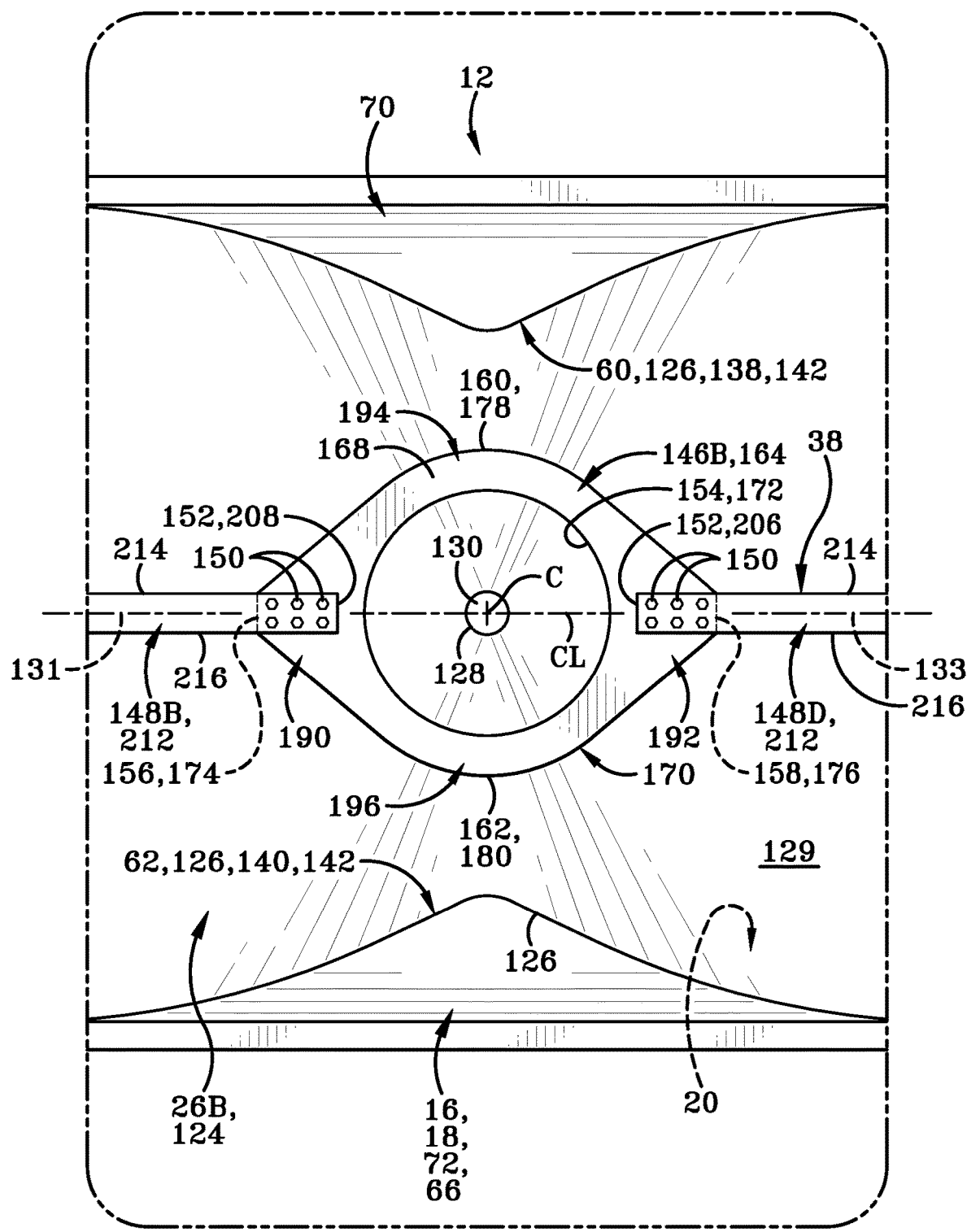
FIG. 5 an enlarged view of the encircled portion marked "See FIG. 5" in FIG. 3 showing part of the central hopper and a central portion of the tension bar assembly including the intermediate/central flange, a rear portion of a front tension bar and a front portion of a rear tension bar.
Figure 6:
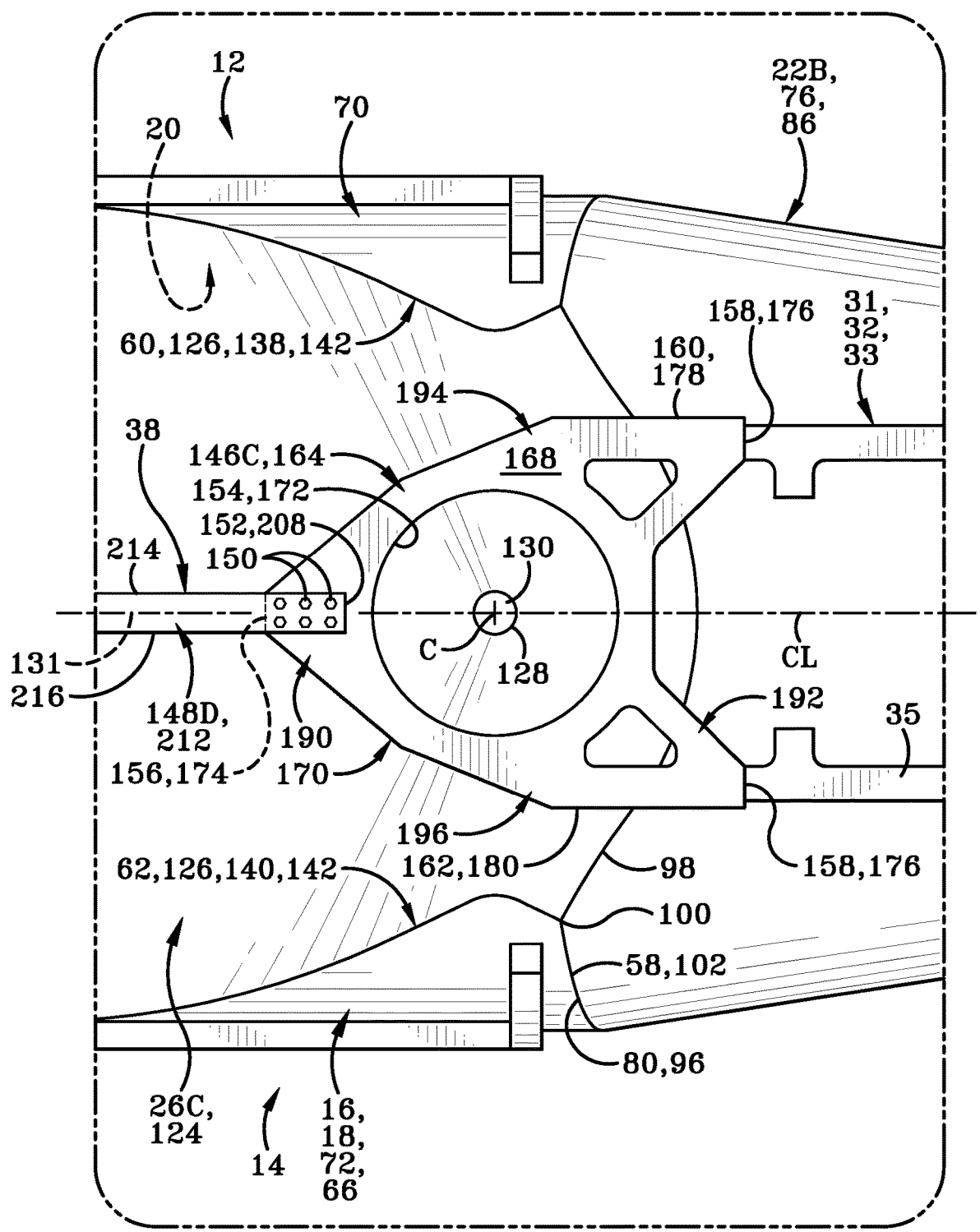
FIG. 6 an enlarged view of the encircled portion marked "See FIG. 6" in FIG. 3 showing part of the rear end housing, part of the rear hopper and a rear portion of the tension bar assembly including the rear flange and a rear portion of a rear tension bar.
Figure 7:
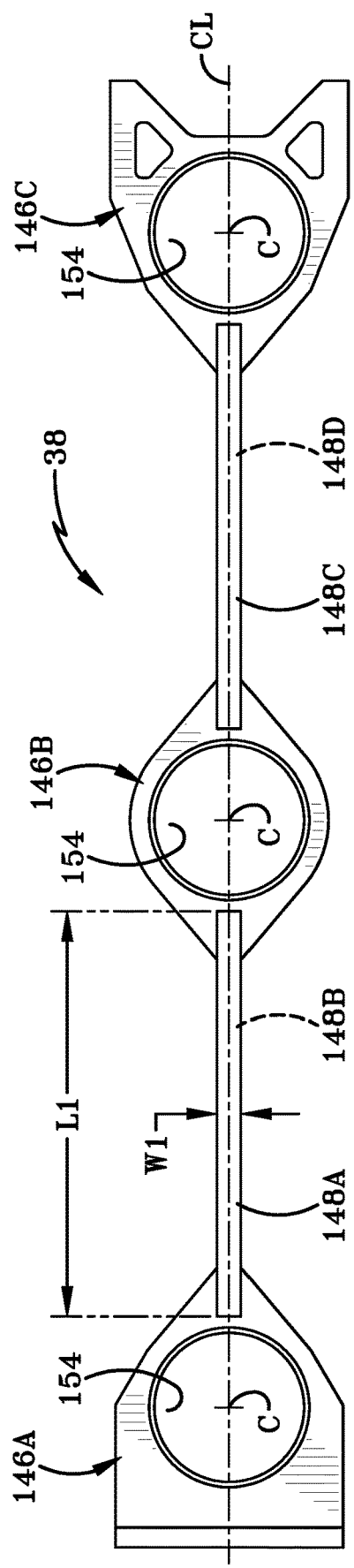
FIG. 7 is a top plan view of the tension bar assembly.

End housing 22A is now described with primary reference to FIGS. 1-3. Sidewall 76 may have a rear or back end or edge 80 and a front end or edge 82. Sidewall 76 may have inner and outer surfaces 84 and 86 each of which may extend from end 80 to end 82. Back edge 80 may have an upper segment 96 and a lower segment 98 which intersect one another at two intersections 100. More particularly, upper edge segment 96 may have an inverted U-shaped configuration as viewed from the rear (similar to the inverted U-shaped configuration of top wall 54 shown in FIG. 13 in section) so that upper segment 96 may have a left bottom end also represented by 100 in FIG. 3 and a right bottom end also represented by 100 in FIG. 4. Lower edge segment 98 may have a U-shaped configuration as viewed from the front or back, as shown in FIGS. 5 and 7. The left intersection 100 of FIG. 3 may also represent the left top rear end of lower segment 98, while the right intersection 100 shown in FIG. 4 may represent the right top rear end of lower segment 98. Edge 80 as a whole as viewed from the rear may have a generally circular or oval configuration and may be continuous so as to form a closed loop. Upper segment 96 may be straight as viewed from the side and may lie entirely along an upwardly extending plane which may extend axially across trailer 1 and be closely adjacent and parallel to the plane along which front edge 56 of top wall 54 lies, whereby these two planes may be nearly coplanar. Lower segment 98 may curve in a continuous fashion as viewed from the front or as viewed from below from the left intersection or end 100 to the right intersection or end 100. Lower segment 98 may curve concavely in a mating fashion with the convexly curved outer surface of the hopper 26A sidewall. End housing 22A/sidewall 76 may be rigidly secured to top wall 54 and hopper 26A by a weld 102. Weld 102 may include an upper weld segment 102A and a lower weld segment 102B which respectively secure top wall 54 and hopper 26A to end housing 22A sidewall 76. Weld 102 may be a continuous weld along the entirety of back edge 80 and thus have a configuration similar to that of back edge 80. Thus, weld 102 as viewed from the front or back may be generally circular or oval or have a closed loop configuration. As viewed from the front or back, upper weld segment 102A may likewise have the same type of inverted U-shaped configuration as upper segment 96, whereas lower weld segment 102B may have a U-shaped configuration as viewed from the front or back which is essentially the same as that of lower segment 98. Upper weld 102A as viewed from the side may be straight and may lie along a plane which may extend axially across trailer 1 and be closely adjacent and parallel to or coplanar with the two planes along which front edge 56 and upper segment 96 respectively lie. Lower weld 102B may be continuously curved as viewed from the bottom and as viewed from the side from adjacent left intersection/ends 100 to adjacent right intersection/ends 100.

Sidewall 76 in cross section (as viewed from the front or rear) may have a circular, oval or other closed loop configuration. End housing 22A/sidewall 76 may have a longitudinally elongated peak 106 at the intersection of center plane CL and outer surface 86 along the top of sidewall 76. Peak 106 may extend from adjacent the top of front edge 82 to adjacent the top of back edge 80. Housing 22A and sidewall 76 may also have a longitudinally elongated base 108 at the intersection of center plane CL and outer surface 86 along the bottom of sidewall 76. Base 108 may extend from adjacent the bottom of front edge 82 to adjacent the bottom of back edge 80 and lower edge segment 98. Sidewall 76 may have first and second sides 110 and 112 which may respectively serve as left and right sides of the sidewall and end housing. Each of sides 110 and 112 may be longitudinally elongated from front edge 82 to back edge 80.

As viewed from above (FIG. 2), end housing 22A and sidewalls 76 may taper from back end or edge 80 to front end or edge 82 so as to become increasingly narrower from back to front; left side 110 may taper or angle forward and to the right from adjacent edge 80 to adjacent edge 82; right side 112 may taper or angle forward and to the left from adjacent back edge 80 to adjacent front edge 82; and sidewall 76 may be axially wider (from left to right perpendicular to plane CL) at or adjacent back end 80 than at or adjacent front end 82. As viewed from the side (FIG. 2), end housing 22A and sidewall 76 may taper from adjacent back end 80 to adjacent front end 82 so as to narrow from back to front; housing 22A and sidewall 76 may be vertically wider at or adjacent back end 80 than at end or edge 82; peak 106 may angle or taper downward and forward from adjacent back end 80 to adjacent end 82; and peak 106 may angle downward and forward along a straight line at a constant angle from adjacent back end 80 to adjacent front end 82. As viewed from the front or rear, inner surface 84 of sidewall 76 may be concavely curved in its entirety whereas outer surface 86 may be convexly curved in its entirety.

With primary reference to FIGS. 1-3, cap wall 78 is now described. As viewed from the front or rear, cap wall may, for instance, have a circular or oval configuration. Cap wall 78 may have first and second ends 114 and 116. The first or back end 114 may be an edge which has essentially the same size and shape as edge 82 of sidewall 76 although edge 114 may face rearwardly while edge 82 faces forward. Cap wall 78 may be secured to sidewall 76 by a weld 122 between/along edges 82 and 114.

With primary reference to FIGS. 1, 3-6 and 9-11, each hopper 26 may have a hopper sidewall 124 having a top edge 126 and a bottom edge 128 which defines a bottom exit opening 130. Bottom edge 128 and opening 130 may be circular as viewed from above or below. Sidewall 124 may be formed of an aluminum alloy or other suitable metal. Each exit opening 130 is adjacent a respective valve assembly 40 and is in fluid communication with discharge pipe 44 when the given valve assembly 40 is in the open position so as to allow air and particulate material within storage chamber 20 and the given hopper to flow downwardly through exit opening 130 into discharge pipe 44. Each sidewall 124 may taper downwardly and inwardly from adjacent top edge 126 to adjacent bottom edge 128 and opening 130. The top edge 126 of each of hoppers 26A and 26B may have a rear edge segment or portion 132 (FIG. 1) which may be U-shaped as viewed from the front or rear.

The top edge 126 of each of hoppers 26B and 26C may include a front edge segment or portion 134 (FIG. 1) which may be U-shaped as viewed from the front or rear. Segments 132 and 134 may be essentially of the same size and the same shape. Rear edge segment 132 of hopper 26A and front edge segment 134 of hopper 26B may be closely adjacent and face one another and be secured to one another by a weld 136 which may likewise be U-shaped as viewed from the front or rear and extend along the entirety of segments 132 and 134. Similarly, rear edge segment 132 of hopper 26B and front edge segment 134 of hopper 26C may be closely adjacent one another and secured to one another by a weld 136 which may be U-shaped as viewed from the front or rear and extend along the entirety of segments 132 and 134.

Alternately, ribs 23 may be used, wherein each rib 23 may be U-shaped as viewed from the front or rear and extend between or along the entirety of a given set of segments 132 and 134 which are adjacent one another. Thus, front rib 23 may extend between/along the rear edge segment 132 of hopper 26A and front edge segment 134 of hopper 26B so that there may be two welds 136 (FIG. 9), one of which may be between the hopper and front rib along hopper 26A rear edge segment 132 and the front surface of front rib 23 and the other of which may be between the hopper and front rib along hopper 26B front edge segment 134 and the rear surface of front rib 23. Similarly, rear rib 23 may extend between/along the rear edge segment 132 of hopper 26B and front edge segment 134 of hopper 26C so that there may be two welds 136, one of which may be between the hopper and rear rib along hopper 26B rear edge segment 132 and the front surface of rear rib 23 and the other of which may be between the hopper and rear rib along hopper 26C front edge segment 134 and the rear surface of rear rib 23.

Top edge 126 may also include left and right edge segments or portions 138 and 140. Left side bottom edge 60 of top wall 54 may be rigidly secured to the left edge segments 138 of hopper sidewalls 124 of each of the hoppers by a weld 142 which may extend in a continuous fashion along the entirety of bottom edge 60 or from adjacent the front end or intersection 100 of edge 60 to the back end or intersection 100 of bottom edge 60. Right side bottom edge 62 of top wall 54 may likewise be secured to right edge segment 140 of the sidewalls of each of the hoppers by an analogous weld 142 along the right side. The top edge 126 of frontmost hopper 26A/sidewall 124 may have a front edge segment or portion 144 extending from the front of left edge segment 138 to the front of right edge segment 140. Similarly, the top edge 126 of rearmost hopper 26C/sidewall 124 may have a rear edge segment or portion also represented by number 144 which extends from the back or rear end of left edge segment 138 to the back or rear end of right edge segment 140.

Figure 9:
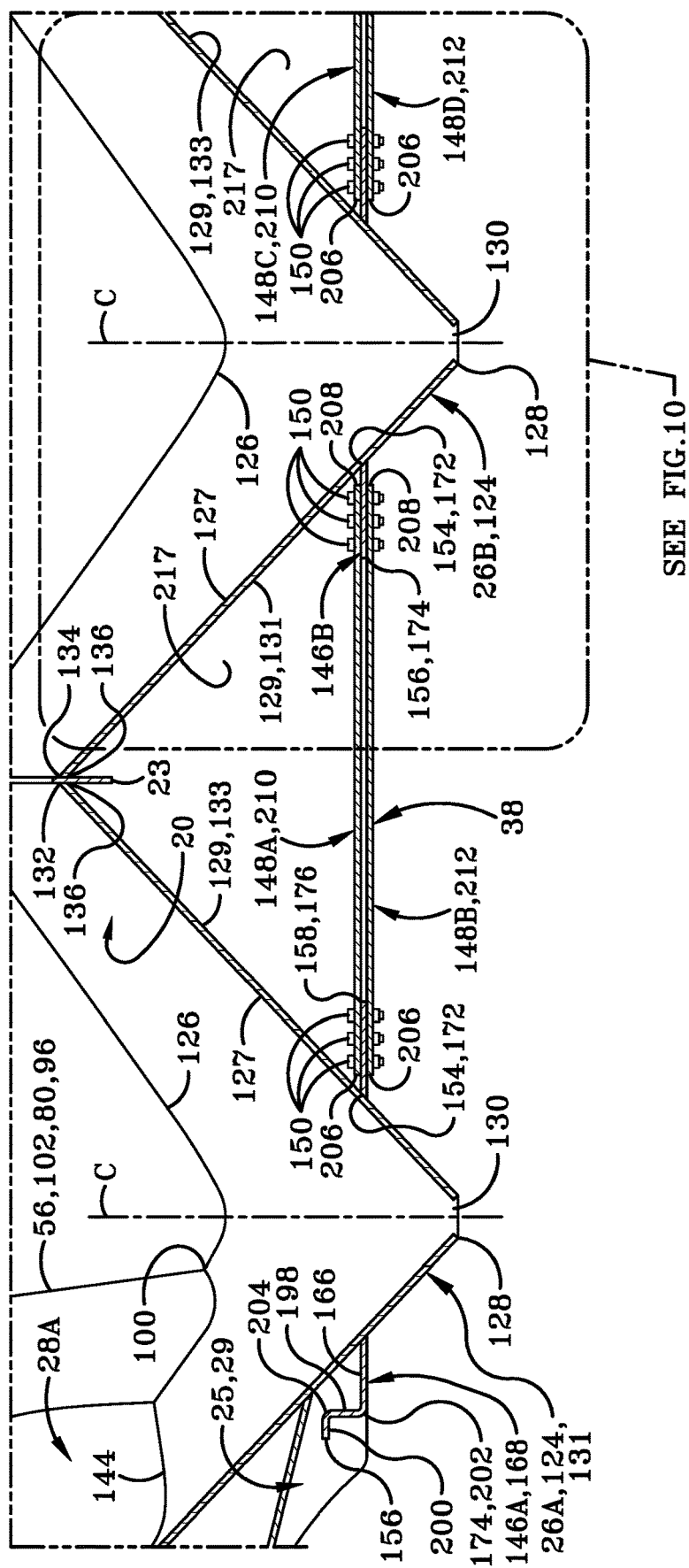
FIG. 9 is a section view taken on a central vertical longitudinally extending plane looking rightward and showing portions of the front and intermediate hoppers and part of the tension bar assembly including the front flange, the intermediate/central flange, the front upper and lower tension bars and a front portion of rear upper and lower tension bars.
Figure 10:
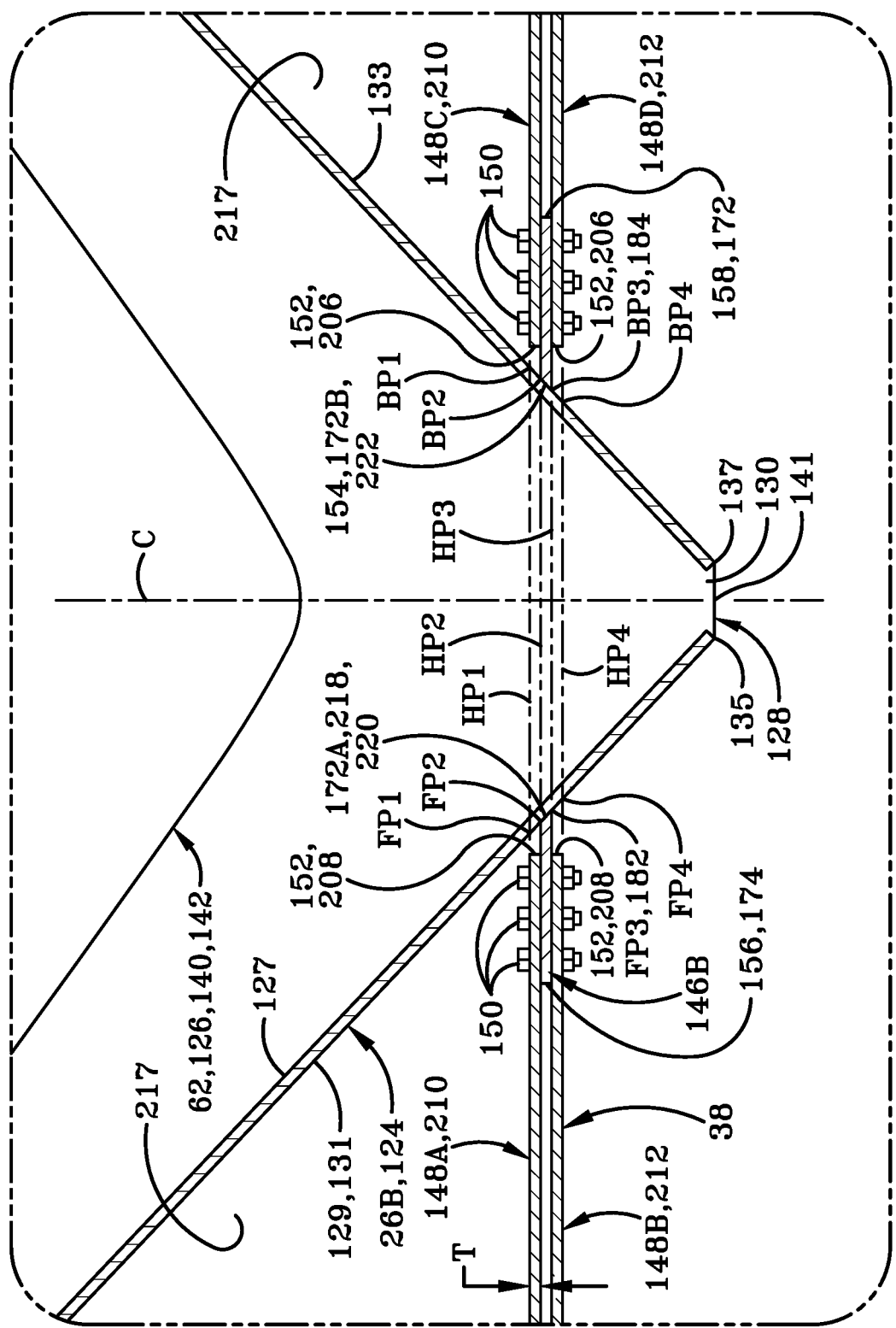
FIG. 10 is an enlarged section view from the same perspective as FIG. 9 showing a portion of the intermediate hopper and part of the tension bar assembly including the intermediate/central flange, a rear portion of the front upper and lower tension bars and a front portion of rear upper and lower tension bars.
Figure 11:
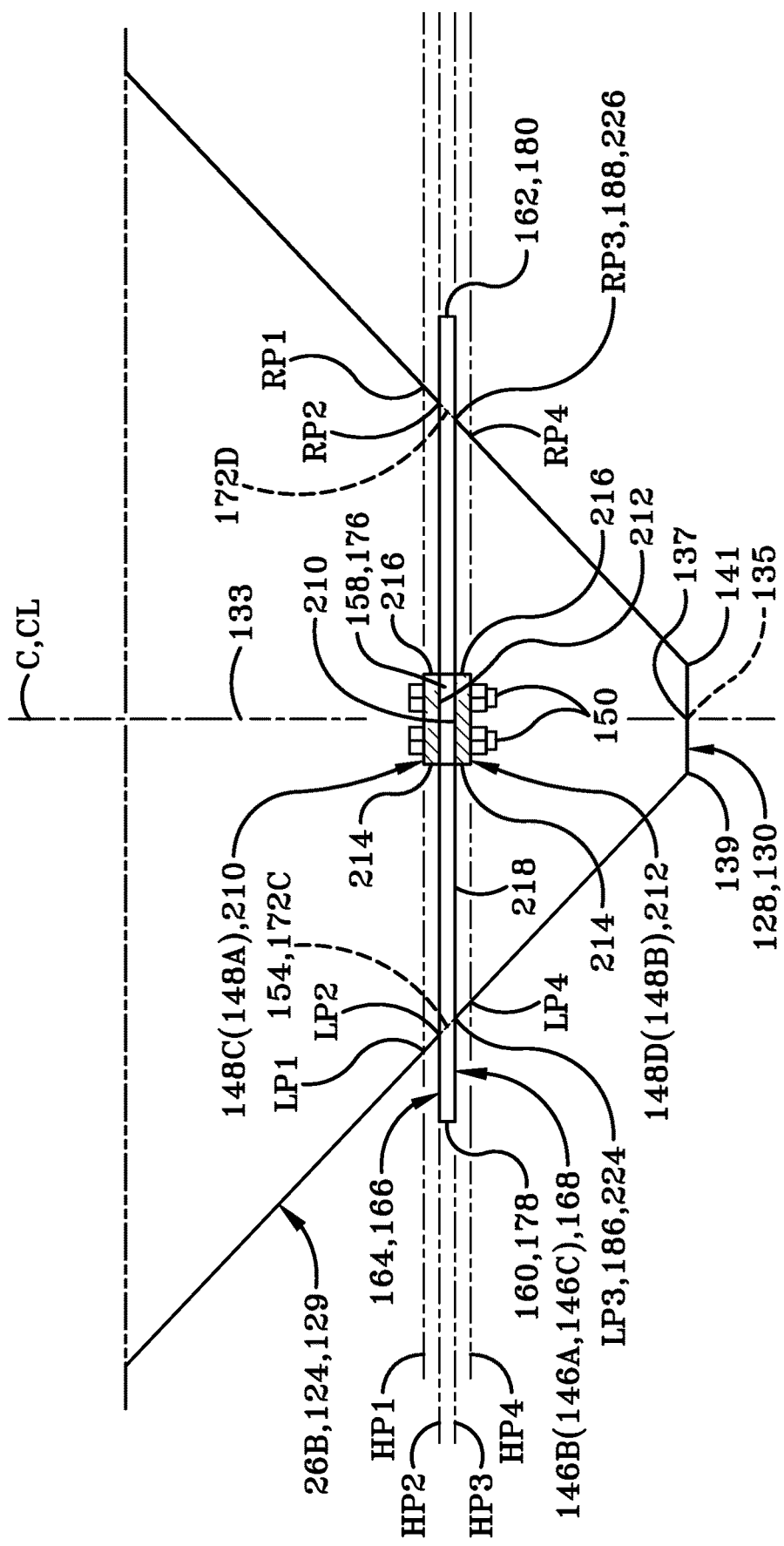
FIG. 11 is an enlarged section view taken on line 11-11 of FIG. 1 cutting through upper and lower tension bars and showing a portion of one of the hoppers and one of the tension bar assembly flanges from the rear.

Each of hopper sidewalls 124 may have inner and outer surfaces 127 and 129 each of which extends continuously from top edge 126 to bottom edge 128. The outer surface 129 of each hopper 26 sidewall 124 may have a front base 131 along the front portion of sidewall 124 and a rear base 133 along the rear portion of sidewall 124. Front base 131 may be defined at the intersection between plane CL and the front of outer surface 129 from top edge 126 to bottom edge 128. Front base 131 may be or extend along a straight line and may face forward and downward. Rear base 133 may be defined at the intersection between plane CL and the back of outer surface 129 from top edge 126 to bottom edge 128. Rear base 133 may be or extend along a straight line and may face rearward and downward. Each sidewall 124 and its inner and outer surfaces 127 and 129 may taper or angle downwardly and inwardly from top edge 126 to bottom edge 128 and exit opening or hole 130. The front portions of each sidewall 124 and the inner and outer surfaces 127 and 129 thereof and front base 131 may angle downward and rearward from adjacent the front of the given top edge 126 to adjacent a front, front end or front side 135 of the given bottom edge 128 and exit opening 130, whereas the rear portion of each sidewall 124 and the inner and outer surfaces 127 and 129 thereof and rear base 133 may angle downward and forward from adjacent the back end of the given top edge 126 to a rear, rear/back end or rear/back side 137 of the given bottom edge 128 and exit opening 130, as shown in FIGS. 1, 9 and 10. Similarly, the left portion of each sidewall 124 and the inner and outer surfaces 127 and 129 thereof may angle downward to the right from adjacent left edge segment 138 to adjacent a left side 139 of bottom edge 128 and exit opening 130, whereas the right side of each sidewall 124 and its inner and outer surfaces 127 and 129 may angle downward to the left from adjacent right edge segment 140 to a right side 141 of bottom edge 128 and exit opening 130, as generally illustrated in FIG. 11.

Slide plate assembly 28A may be rigidly secured to end housing 22A sidewall 76 and hopper 26A by various welds so as to provide an airtight interior chamber 20 which is separated from end housing chamber 24A by assembly 28A so that chamber 20 may extend rearward of assembly 28A and chamber 24A may extend forward of assembly 28A and so that each of chamber 20 and chamber 24A may be partially defined by assembly 28A. More particularly, front assembly 28A may include a slide plate which may be secured adjacent a rear lower end thereof to the top front edge segment 144 of front hopper 26A sidewall 124 and extend upward and forward therefrom inside front end housing 22A, and which may be secured along left and right side edge segments thereof to inner surface 84 of end housing 22A sidewall 76. Similarly, back assembly 28A may include a slide plate which may be secured adjacent a front lower end thereof to the top back edge segment 144 of rear hopper 26C sidewall 124 and extend upward and rearward therefrom inside rear end housing 22B, and which may be secured along left and right side edge segments thereof to inner surface 84 of end housing 22B sidewall 76. Chamber 20 is defined primarily by the inner surface of top wall 54, the inner surfaces of hopper sidewalls 124, and inner surfaces of assemblies 28A and 28B.

Tension bar assembly 38 is now described with primary reference to FIGS. 4-9. Tension bar assembly 38 may include a plurality of flanges 146, a plurality of tension bars 148, a plurality of fasteners 150 and a plurality of welds 152. Flanges 146, tension bars 148, fasteners 150 and welds 152 may be formed of a rigid metal or other rigid material. Flanges 146, bars 148 and welds 152 may be formed of an aluminum alloy. Flanges 146 may include a front flange 146A, an intermediate or central flange 146B and a rear flange 146C. Assembly 38 may have front and rear ends between assembly 38 is longitudinally elongated, wherein these front and rear ends may be respectively adjacent the front of front flange 146A and the back of rear flange 146C.

Each of flanges 146 may be an annular flange defining a hopper-receiving hole 154. Each of flanges 146 may have a front or frontmost end or edge 156, a back or rear or rearmost end or edge 158, a left or leftmost end or edge 160 and a right or rightmost end or edge 162. Each of flanges 146 may, for example, include or be formed entirely as a plate or a piece of sheet metal. The plate or piece of sheet metal may be flat or may be bent to form portions which are angled relative to one another. For instance, each of flanges 146 may include a plate 164 which may be flat and have an upwardly facing top surface 166, a downwardly facing bottom surface 168, an outer perimeter edge 170 and an inner perimeter edge 172 which defines the respective through hole 154. Edge 172 and hole 154 may be circular as viewed from the top or bottom. Top and bottom surfaces 166 and 168 may be flat and horizontal from outer perimeter edge 170 to inner perimeter edge 172. Edges 170 and 172 may extend from top surface 166 to bottom surface 168.

Each plate 164 and outer perimeter edge 170 may have a front end/edge segment 174, a rear or back end/edge segment 176, a left end/edge segment 178 and a right end/edge segment 180. Segments 174, 176, 178 and 180 may respectively define frontmost end 156, rearmost end 158, leftmost end 160 and rightmost end 162 although front end 174 of front flange 146A plate 164 may not define frontmost end 156 as noted below. Each inner perimeter edge 172 may include a rearward facing front portion 172A, a forward facing rear portion 172B, a rightward facing left portion 172C and a leftward facing right portion 172D. Each inner perimeter 172 may have a frontmost point 182, a rearmost point 184, a leftmost point 186 and a rightmost point 188 which may be respectively defined by portions 172A, 172B, 172C and 172D. Each flange 146 and plate 164 may have a front portion 190, a rear or back portion 192, a left portion 194 and a right portion 196. Each front flange or plate portion 190 may define the respective front end/edge segment 174, frontmost end 156, the inner perimeter edge front portion 172A and frontmost point 182. Each rear flange or plate portion 192 may define the respective rear end/edge segment 176, rearmost end 158, the inner perimeter edge rear portion 172B and rearmost point 184. Each left flange or plate portion 194 may define the respective left end/edge segment 178, leftmost end 160, the inner perimeter edge left portion 172C and leftmost point 186. Each right flange or plate portion 196 may define the respective right end/edge segment 180, rightmost end 162, the inner perimeter edge right portion 172D and rightmost point 188.

Front flange 146A may include first and second axially elongated legs 198 and 200. Leg 198 may be an upward extending or vertical leg, and leg 200 may be a forward extending or horizontal leg. Leg 198 may be secured at a bottom end or edge thereof to front end/edge 174 of flange 146A plate 164 at an axially elongated bend, corner or intersection 202 between leg 198 and plate 164. Leg 200 may be secured at a rear end or edge thereof to a top end/edge of leg 198 at an axially elongated bend, corner or intersection 204 between legs 198 and 200. Bends, corners or intersections 202 and 204 may be parallel to one another and horizontal.

Each of flanges 146 may be intersected by plane CL so that a left portion or half of the given flange 146 lies to the left of or on the left side of plane CL and a right portion or half of the given flange 146 lies to the right of or on the right side of plane CL. Each of flanges 146 may be bilaterally symmetrical about plane CL so that the left half of a given flange 146 is a mirror image of the right half of the given flange 146. More particularly, for each given flange 146, each of front end 156, back end 158, plate 164, top surface 166, bottom surface 168, outer perimeter edge 170, inner perimeter edge 172, hole 154, front edge segment 174, rear edge segment 176, front portion 172A, rear portion 172B, frontmost point 182, rearmost point 184, front portion 190 and back portion 192 may be intersected by plane CL so that each of left end 160, left edge segment 178, left portion 172C, leftmost point 186 and left portion 194 may be to the left of or on the left side of plane CL, and so that each of right end 162, right edge segment 180, right portion 172D, rightmost point 188 and right portion 196 may be to the right of or on the right side of plane CL. Legs 198 and 200 of front flange 146A may also be intersected by plane CL.

Figure 8A:
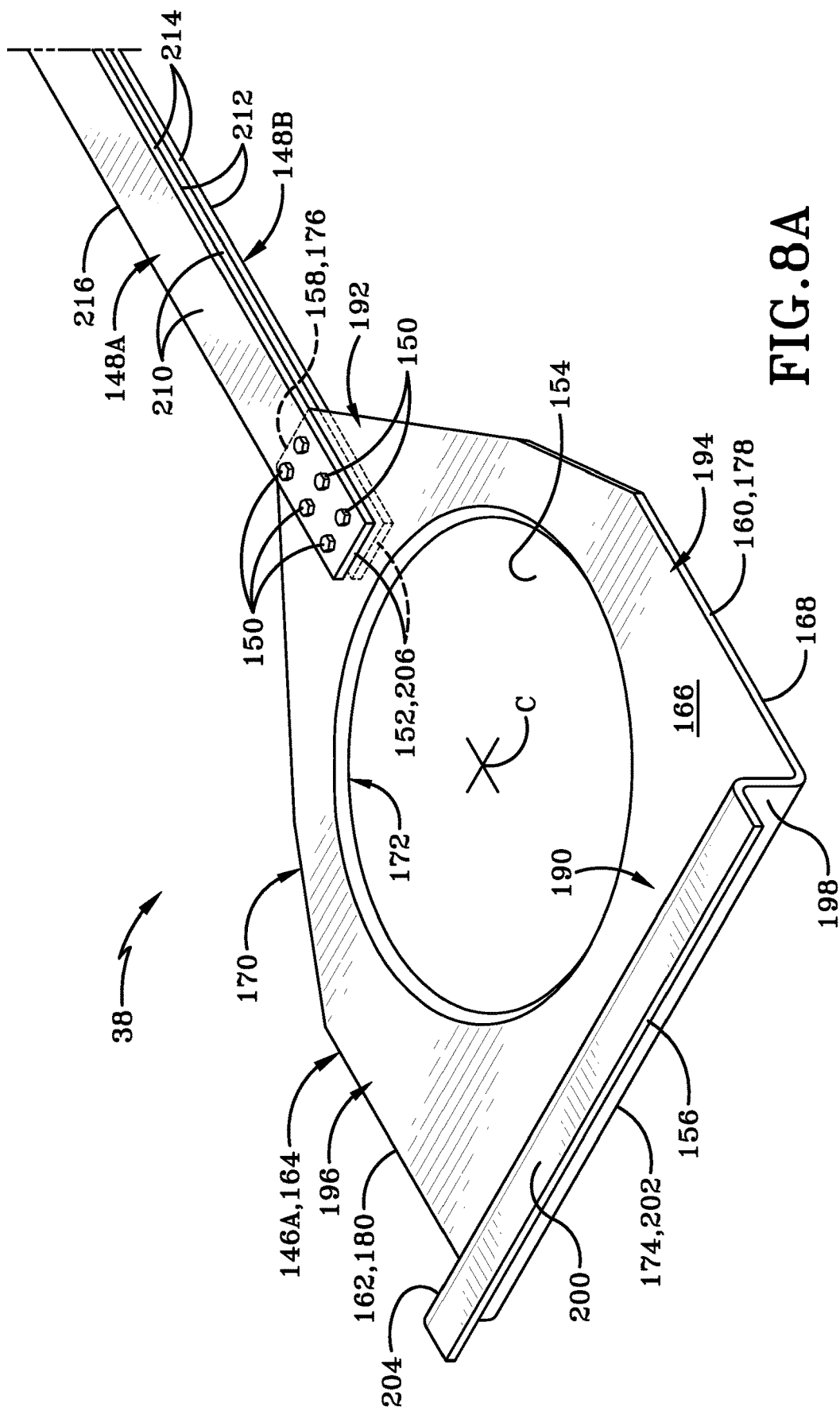
FIG. 8A is an enlarged perspective view of a front portion of the tension bar assembly including the front flange and a front portion of front upper and lower tension bars.
Figure 8B:
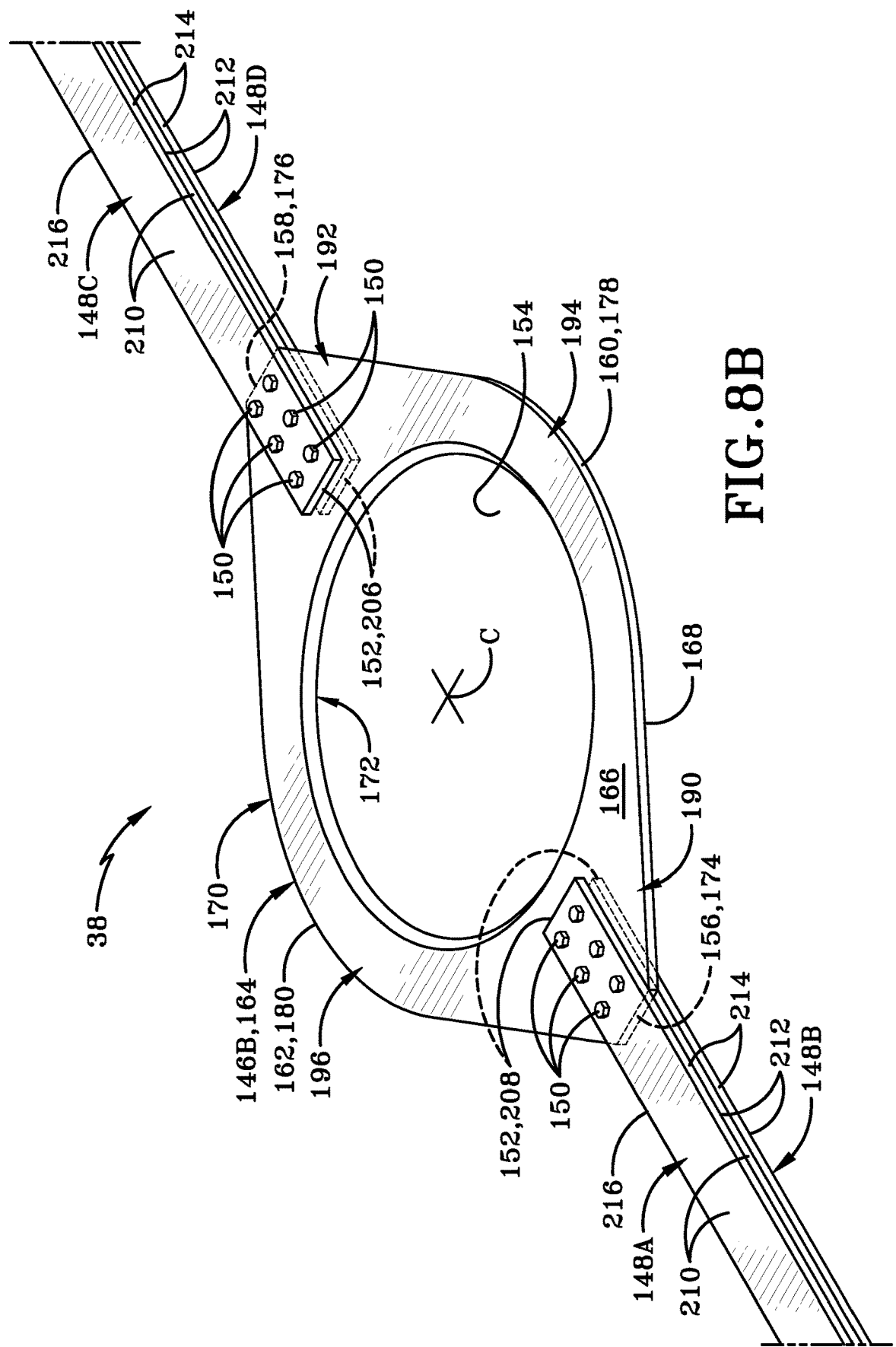
FIG. 8B is an enlarged perspective view of a central portion of the tension bar assembly including the intermediate/central flange, a rear portion of front upper and lower tension bars and a front portion of rear upper and lower tension bars.

With primary reference to FIGS. 7-9, tension bars 148 may include tension bars 148A-D, wherein bar 148A may be a front upper tension bar, bar 148B may be a front lower tension bar, bar 148C may be a rear upper tension bar, and bar 148D may be a rear lower tension bar. Each tension bar may have a front end 206, a rear or back end 208, an upwardly facing top surface 210, a downwardly facing bottom surface 212, a leftward facing left side or edge 214 and a rightward facing right side or edge 216. Top and bottom surfaces 210 and 212 may be parallel to one another and may be horizontal from adjacent front end 206 to adjacent back end 208 and from adjacent left side/edge 214 to adjacent right side/edge 216. Surfaces 210 and 212 may be perpendicular to plane CL. Left and right sides/edges 214 and 216 may be parallel to one another and may be vertical from adjacent front end 206 to adjacent back end 208 and from adjacent top surface 210 to adjacent bottom surface 212. Sides/edges 214 and 216 may be parallel to plane CL and perpendicular to sides/edges 214 and 216.

Front and rear ends 206 and 208 (or frontmost and rearmost points of a given tension bar) may define therebetween a longitudinal or normal length L1 (FIG. 7) of the given tension bar. Length L1 may be a horizontal longitudinal length or distance which may be measured horizontally in the longitudinal direction parallel to plane CL. Left and right sides or edges 214 and 216 (or leftmost and rightmost points of a given tension bar) may define therebetween a normal width W1 (FIG. 7). Width W1 may be a horizontal axial maximum distance or width of a given tension bar which may be measured horizontally in the axial direction perpendicular to plane CL and length L1 and parallel to plane VP. Top and bottom surfaces 210 and 212 may define therebetween a normal thickness T1 (FIG. 10). Thickness T1 may be a vertical maximum distance or thickness of a given tension bar which may be measured vertically (perpendicular to length L1 and width W1). Length L1 may, for example, be about 78 inches and may be within a range of 65 to 90 inches. Width W1 may, for example, be about 4 inches and may be within a range of 1, 2 or 3 inches to 5, 6, 7, 8, 9 or 10 inches. Thickness T1 may, for example, be about ⅜ inch or ¾ inch and may be within a range of ¼ or ⅜ inch to ½, ⅝, ¾, ⅞ or 1 inch. However, length L1, width W1 and thickness T1 may vary depending on the size of the trailer, hoppers and other components as well as the specific configuration of the given tension bar, such as having different cross sectional configurations as discussed herein. Length L1 may be, for example, at least 5, 10 or 15 times width W1; and width W1 may be 5 or 10 times thickness T1 although again this may vary.

Figure 7A:
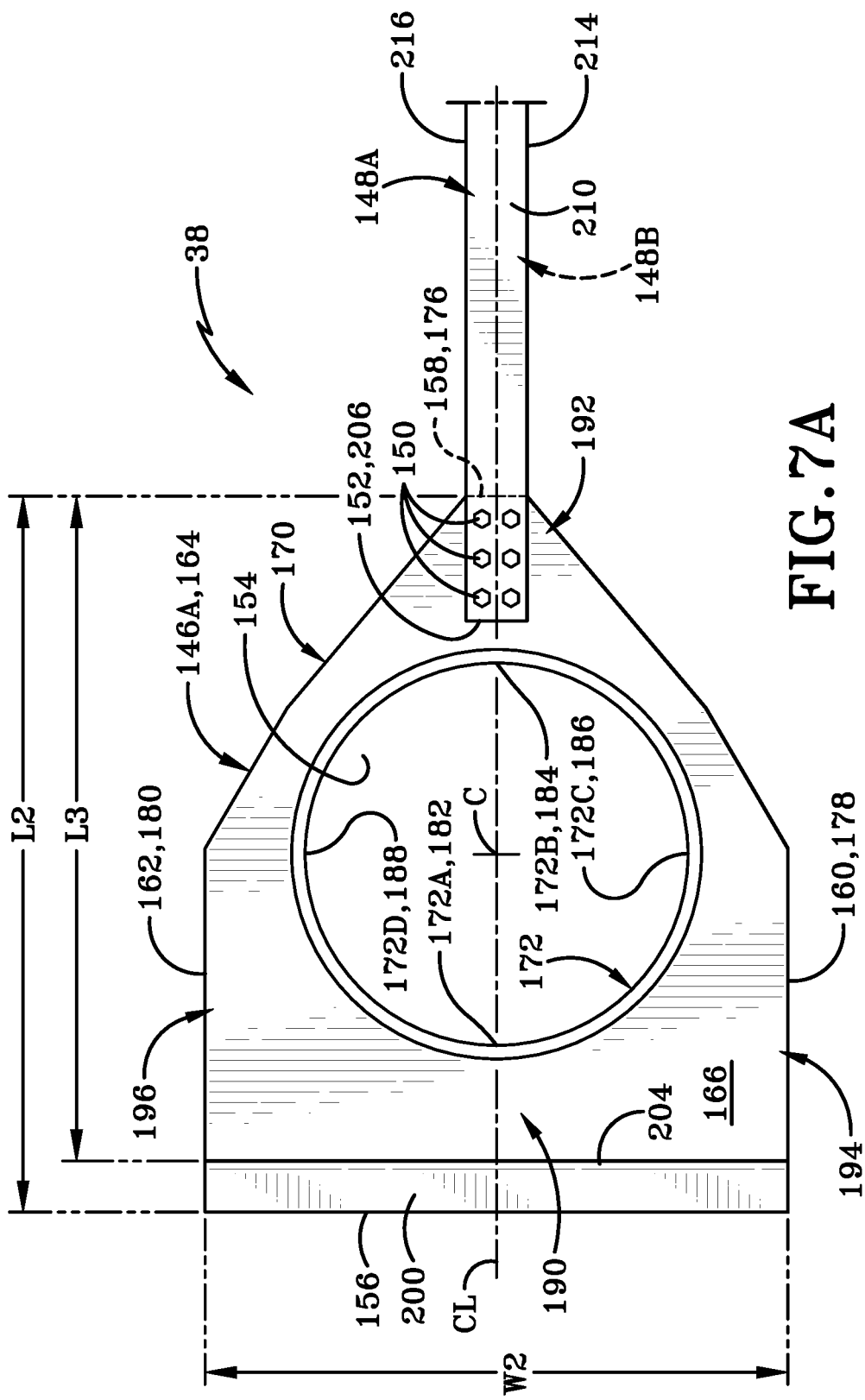
FIG. 7A is an enlarged top plan view of a front portion of the tension bar assembly including the front flange and a front portion of the front upper tension bar.
Figure 7B:
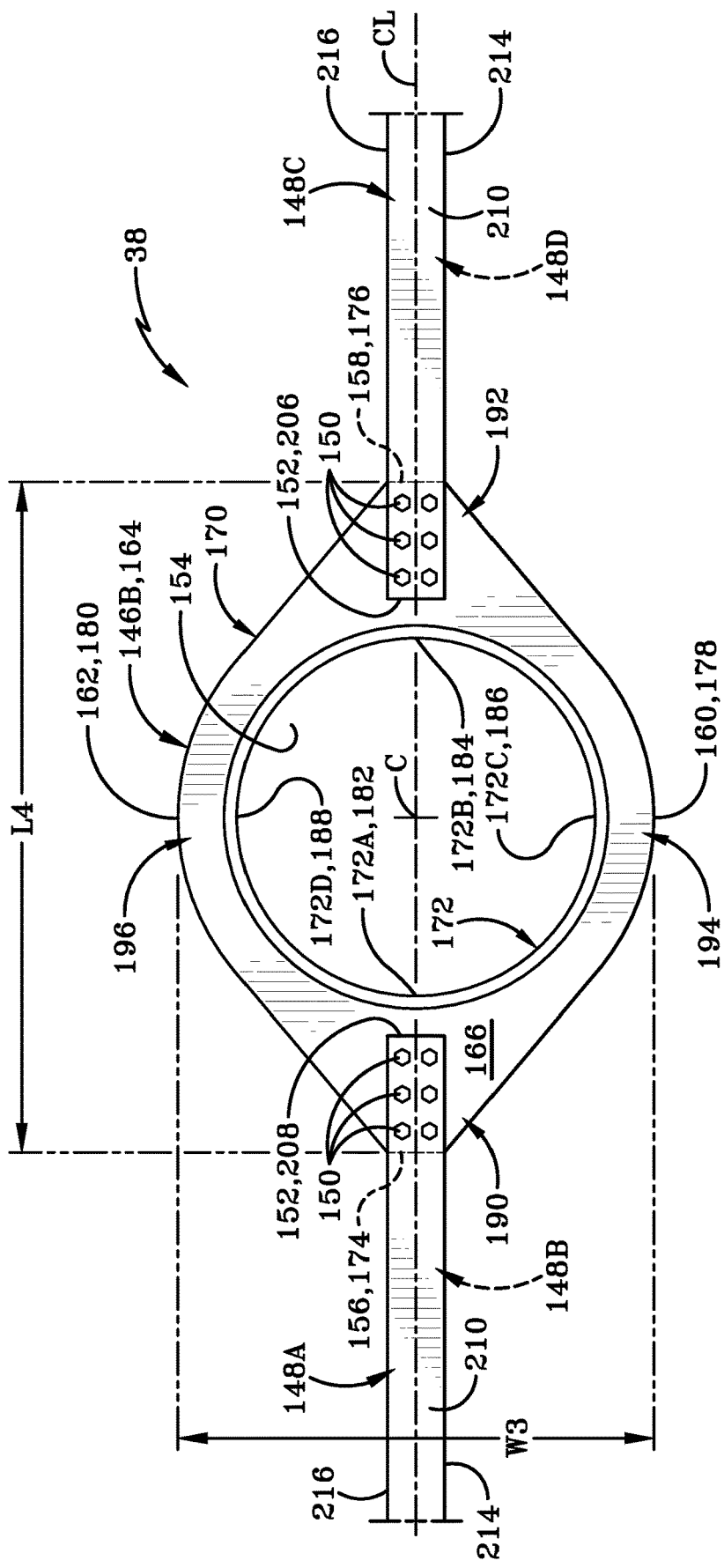
FIG. 7B is an enlarged top plan view of a central portion of the tension bar assembly including the intermediate/central flange, a rear portion of the front upper tension bar and a front portion of the rear upper tension bar.
Figure 7C:
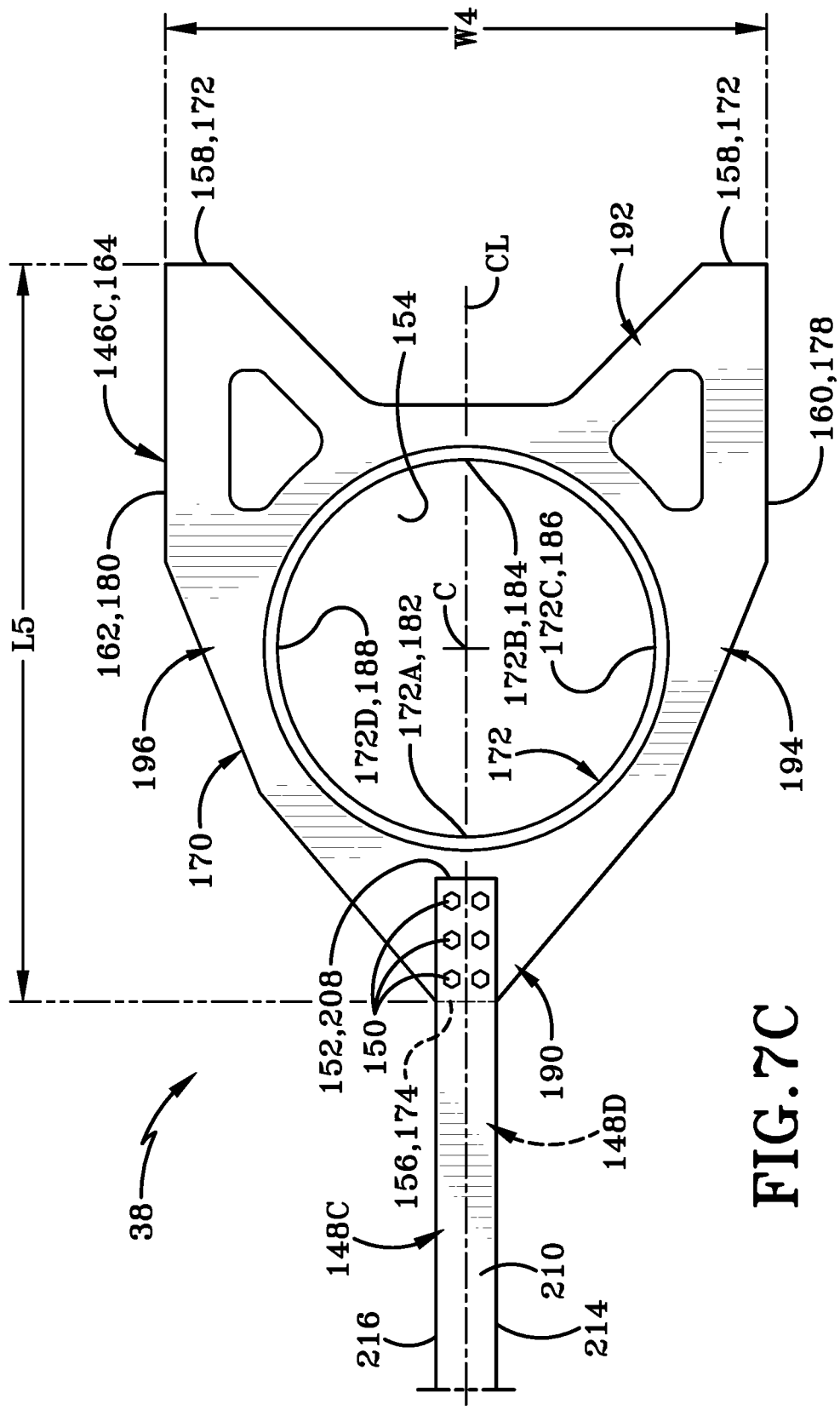
FIG. 7C is an enlarged top plan view of a rear portion of the tension bar assembly including the rear flange and a rear portion of the rear upper tension bar.

With reference to FIGS. 7A, 7B and 7C, various lengths and widths are provided. Front flange 146A frontmost and rearmost points 156 and 158 may define therebetween a normal longitudinal length L2 (FIG. 7A) of flange 146A. Front flange 146A plate 164 front and rear ends/edges 174 and 176 may define therebetween a normal longitudinal length L3 (FIG. 7A) of flange 146A plate 164. Central flange 146B frontmost and rearmost points 156 and 158 (or central flange 146B plate 164 front and rear ends/edges 174 and 176) may define therebetween a normal longitudinal length L4 (FIG. 7B) of flange 146B and flange 146B plate 164. Rear flange 146C frontmost and rearmost points 156 and 158 (or rear flange 146C plate 164 front and rear ends/edges 174 and 176) may define therebetween a normal longitudinal length L5 (FIG. 7C) of flange 146C and flange 146C plate 164. Front flange 146A leftmost and rightmost ends/edges/points 160 and 162 may define therebetween a normal axial width W2 (FIG. 7A) of flange 146A and flange 146A plate 164. Central flange 146B leftmost and rightmost points 160 and 162 may define therebetween a normal axial width W3 (FIG. 7B) of flange 146B and flange 146B plate 164. Rear flange 146C leftmost and rightmost points 160 and 162 may define therebetween a normal axial width W4 (FIG. 7C) of flange 146C and flange 146C plate 164. Any of flange or flange plate lengths L2, L3, L4 and L5 may be greater than any of flange or flange plate widths W2, W3 and W4. Tension bar length L1 of any of the tension bars 148 may be greater than any of lengths L2, L3, L4 and L5 and any of widths W2, W3 and W4.

Each tension bar 148 may be straight as viewed from the side and/or as viewed from above or below. Each tension bar 148 may be formed entirely as a flat longitudinally elongated plate. Bars 148 may also have different configurations. For instance, a given bar 148 may be in the form of a longitudinally elongated angle iron (for instance having a V-shaped or L-shaped cross sectional configuration), a longitudinally elongated channel (for instance having a U-shaped or C-shaped cross sectional configuration), or a solid rod or hollow tube having various types of cross sectional configurations (such as circular, oval, square, rectangular and so forth).

Each of tension bars 148A-D may be intersected by plane CL so that a left portion or half of the given tension bar lies to the left of or on the left side of plane CL and a right portion or half of the given tension bar 148 lies to the right of or on the right side of plane CL. Each of tension bars 148 may be bilaterally symmetrical about plane CL so that the left half of a given bar 148 is a mirror image of the right half of the given bar 148. More particularly, for each bar 148, each of front end 206, back end 208, top surface 210, bottom surface 212 may be intersected by plane CL so that left edge 214 may be to the left of or on the left side of plane CL, and so that right edge 216 may be to the right of or on the right side of plane CL. Front upper and lower bars 148A and 148B adjacent front ends 206 thereof may be secured to front flange 146A/plate 164 rear portion 192 adjacent rear end 158/rear edge segment 176 via fasteners 150 and/or 152. Fasteners 150 may be, for example, rivets or pins or threaded fasteners such as a bolt and nut which are threadedly engaged to one another. Each fastener 150 may extend through a set of aligned holes in bars 148A and 148B and flange 146A plate 164 rear portion 192. One of fasteners 152 may be a weld between flange 146A plate 164 top surface 166 and upper bar 148A adjacent front end 206. One of fasteners 152 may be a weld between flange 146A plate 164 bottom surface 168 and lower bar 148B adjacent front end 206. Upper bar 148A bottom surface 212 adjacent front end 206 thereof may be closely adjacent or in contact with top surface 166 of front flange 146A plate 164 rear portion 192 adjacent rear end 158/rear edge segment 176. Lower bar 148B top surface 210 adjacent front end 206 thereof may be closely adjacent or in contact with bottom surface 168 of front flange 146A plate 164 rear portion 192 adjacent rear end 158/rear edge segment 176.

Front upper and lower bars 148A and 148B adjacent back ends 208 thereof may be secured to central/intermediate flange 146B/plate 164 front portion 190 adjacent front end 156/front edge segment 174 via fasteners 150 and/or 152. Fasteners 150 and 152 may be the same as those discussed above. Each fastener 150 may extend through a set of aligned holes in bars 148A and 148B and flange 146B plate 164 front portion 190. One of fasteners 152 may be a weld between flange 146B plate 164 top surface 166 and upper bar 148A adjacent rear end 208. One of fasteners 152 may be a weld between flange 146B plate 164 bottom surface 168 and lower bar 148B adjacent back end 208. Upper bar 148A bottom surface 212 adjacent rear end 208 thereof may be closely adjacent or in contact with top surface 166 of intermediate flange 146B plate 164 front portion 190 adjacent front end 156/front edge segment 174. Lower bar 148B top surface 210 adjacent back end 208 thereof may be closely adjacent or in contact with bottom surface 168 of intermediate flange 1466 plate front portion 190 adjacent front end 156/front edge segment 174.

Rear upper and lower bars 148C and 148D adjacent front ends 206 thereof may be secured to intermediate flange 146B/plate 164 rear portion 192 adjacent rear end 158/rear edge segment 176 via fasteners 150 and/or 152. Fasteners 150 and 152 may be the same as described above. Each fastener 150 may extend through a set of aligned holes in bars 148C and 148D and flange 146B plate 164 rear portion 192. One of fasteners 152 may be a weld between flange 146B plate 164 top surface 166 and upper bar 148C adjacent front end 206. One of fasteners 152 may be a weld between flange 146B plate 164 bottom surface 168 and lower bar 148D adjacent front end 206. Upper bar 148C bottom surface 212 adjacent front end 206 thereof may be closely adjacent or in contact with top surface 166 of flange 146B plate 164 rear portion 192 adjacent rear end 158/rear edge segment 176. Lower bar 148D top surface 210 adjacent front end 206 thereof may be closely adjacent or in contact with bottom surface 168 of flange 146B plate 164 rear portion 192 adjacent rear end 158/rear edge segment 176.

Rear upper and lower bars 148C and 148D adjacent back ends 208 thereof may be secured to rear flange 146C plate 164 front portion 190 adjacent front end 156/front edge segment 174 via fasteners 150 and/or 152. Fasteners 150 and 152 may be the same as those discussed above. Each fastener 150 may extend through a set of aligned holes in bars 148C and 148D and flange 146C plate 164 front portion 190. One of fasteners 152 may be a weld between flange 146C plate 164 top surface 166 and upper bar 148C adjacent rear end 208. One of fasteners 152 may be a weld between flange 146C plate 164 bottom surface 168 and lower bar 148D adjacent back end 208. Upper bar 148C bottom surface 212 adjacent rear end 208 thereof may be closely adjacent or in contact with top surface 166 of rear flange 146C plate 164 front portion 190 adjacent front end 156/front edge segment 174. Lower bar 148D top surface 210 adjacent back end 208 thereof may be closely adjacent or in contact with bottom surface 168 of rear flange 146C plate front portion 190 adjacent front end 156/front edge segment 174.

Tension bar assembly 38 may be rigidly secured to hoppers 26A-C, front frame 25 and back frame 31. The front portion of front flange 146A may be rigidly secured to a rear portion of front frame 25 adjacent rear ends of rails 27 and 29. The front portion of flange 146A may extend from adjacent the rear end of left rail 27 to adjacent the rear end of right rail 29 (and be secured to said rear ends) so that flange 146A extends rearward beyond the back ends of frame 25 and rails 27 and 29. The rear portion of rear flange 146C may be rigidly secured to a front portion of rear/suspension frame 31 adjacent front ends of rails 33 and 35. The rear portion of flange 146C may extend from adjacent the front end of left rail 33 to adjacent the front end of right rail 35 (and be secured to said front ends) so that flange 146C extends forward beyond the front ends of frame 31 and rails 33 and 35. Thus, the front portion of tension bar assembly 38 may be secured to a rear portion of front frame 25 and extend rearward to adjacent the front portion of back frame 31 with the rear portion of assembly 38 secured to a front portion of rear frame 31. Landing gear 34 may be secured to front frame 25 and extend downward therefrom. Landing gear 34 may be rearward of hitch member 2, forward of the bottom edge 128 and exit opening 130 of front hopper 26A, forward of the front valve 42, and longitudinally adjacent the front end of tension bar assembly 38 and front flange 146A. Each flange 146/plate 164 inner perimeter 172, hopper sidewall 124 bottom edge 128, hole 154 and exit opening 130 may be concentric about a respective center or vertical line or axis C which may lie in or adjacent central plane CL.

The front end 206 of each front tension bar 148A and 148B may be adjacent, rearward of, and spaced from/out of contact with the back of front hopper 26A sidewall 124 outer surface 129/rear base 133. The rear end 206 of each front tension bar 148A and 148B may be adjacent, forward of, and spaced from/out of contact with the front of intermediate hopper 26B sidewall 124 outer surface 129/front base 131. The front end 206 of each rear tension bar 148C and 148D may be adjacent, rearward of, and spaced from/out of contact with the back of intermediate hopper 26B sidewall 124 outer surface 129/rear base 133. The rear end 206 of each rear tension bar 148C and 148D may be adjacent, forward of, and spaced from/out of contact with the front of rear hopper 26C sidewall 124 outer surface 129/front base 131.

As viewed from the side (FIG. 1), trailer 1 may define a forward through opening 217 (FIGS. 1, 9, 10) which extends from trailer left side 12 to trailer right side 14 above a top of tension bar assembly 38 below hoppers 26A and 26B and the respective rear base 133 and front base 131 thereof. Forward through opening 217 may extend upward from adjacent front upper tension bar 148A top surface 210, top surface 166 of front flange 146A plate 164 rear portion 192 and top surface 166 of central flange 146B plate 164 front portion 190 to adjacent hopper 26A rear base 133, hopper 26B front base 131, front rib 23, hopper 26A top rear edge segment 132, hopper 26B top front edge segment 134 and the front weld or welds 136 along said edge segments 132 and 134. As viewed from the side (FIG. 1), trailer 1 may also define a rearward through opening 217 (FIGS. 1, 9, 10) which extends from trailer left side 12 to trailer right side 14 above a top of tension bar assembly 38 below hoppers 26B and 26C and the respective rear base 133 and front base 131 thereof. Rearward through opening 217 may extend upward from adjacent rear upper tension bar 148C top surface 210, top surface 166 of central flange 146B plate 164 rear portion 192 and top surface 166 of rear flange 146C plate 164 front portion 190 to adjacent hopper 26B rear base 133, hopper 26C front base 131, rear rib 23, hopper 26B top rear edge segment 132, hopper 26C top front edge segment 134 and the rear weld or welds 136 along said edge segments 132 and 134.

The front end 206 of each front tension bar 148A and 148B may be adjacent, rearward of, and spaced from/out of contact with the back of front hopper 26A sidewall 124 outer surface 129/rear base 133. The rear end 208 of each front tension bar 148A and 148B may be adjacent, forward of, and spaced from/out of contact with the front of intermediate hopper 26B sidewall 124 outer surface 129/front base 131. The front end 206 of each rear tension bar 148C and 148D may be adjacent, rearward of, and spaced from/out of contact with the back of intermediate hopper 26B sidewall 124 outer surface 129/rear base 133. The rear end 208 of each rear tension bar 148C and 148D may be adjacent, forward of, and spaced from/out of contact with the front of rear hopper 26C sidewall 124 outer surface 129/front base 131.

Each of flanges 146/plates 164 may be rigidly secured to the respective hopper 26 by a weld 218 between the given flange 146/plate 164 and the given hopper 26 so that the given flange extends outward from the given hopper outer surface 129 and the given weld 218. More particularly, weld 218 may extend along inner perimeter edge 172 and outer surface 129 of sidewall 124. Weld 218 may extend along the entirety of inner perimeter edge 172 and may have a circular or other closed loop configuration as viewed from above or below. The inner perimeter 172 of a given flange plate 164 may be closely adjacent or in contact with an associated given hopper outer surface 129 along the entirety of inner perimeter 172. Weld 218 may have a frontmost point or portion 220, a rearmost point or portion 222, a leftmost point or portion 224 and a rightmost point or portion 226, as shown in FIGS. 10 and 11, which may be respectively closely adjacent inner perimeter 172 frontmost point 182, rearmost point 184, leftmost point 186 and rightmost point 188. Frontmost and rearmost points or portion 220 and 222 may lie in or be adjacent central plane CL, whereas leftmost point or portion 224 may be spaced to the left of plane CL and rightmost point or portion 226 may be spaced to the right of plane CL. Several imaginary horizontal planes may be associated with tension bar assembly 38 and may be useful for purposes of description. For instance, horizontal planes HP1, HP2, HP3 and HP4 are shown in FIGS. 10 and 11. Horizontal plane HP1 may be defined by top surface 210 or a topmost point of tension bar 148C (or 148A). Said another way, the top surface 210 or topmost point of tension bar 148C (or 148A) may lie in horizontal plane HP1. Horizontal plane HP2 may be defined by tension bar 148C (or 148A) bottom surface 212, a bottommost point of tension bar 148C (or 148A), flange 146B (or 146A or 146C) top surface 166 or a topmost point of flange 146B (or 146A or 146C) or plate 164 thereof; or tension bar 148C (or 148A) bottom surface 212, the bottommost point of tension bar 148C (or 148A), flange 146B (or 146A or 146C) top surface 166 or the topmost point of flange 146B (or 146A or 146C) may lie in horizontal plane HP2. Horizontal plane HP3 may be defined by tension bar 148D (or 148B) top surface 210, a topmost point of tension bar 148D (or 148B), flange 146B (or 146A or 146C) bottom surface 168 or a bottommost point of flange 146B (or 146A or 146C) or plate 164 thereof; or tension bar 148D (or 148B) top surface 210, the topmost point of tension bar 148D (or 148B), flange 146B (or 146A or 146C) bottom surface 168 or the bottommost point of flange 146B (or 146A or 146C) or plate 164 thereof may lie in horizontal plane HP3. Horizontal plane HP4 may be defined by tension bar 148D (or 148B) bottom surface 212 or a bottommost point of tension bar 148D (or 148B); or tension bar 148D (or 148B) bottom surface 212 or the bottommost point of tension bar 148D (or 148B) may lie in horizontal plane HP4.

As shown in FIG. 10, horizontal plane HP1 may intersect hopper 26B (or 26A or 26C) sidewall 124 outer surface 129 at frontmost and rearmost points FP1 and BP1 of outer surface 129 which lie in plane HP1; horizontal plane HP2 may intersect hopper 26B (or 26A or 26C) sidewall 124 outer surface 129 at frontmost and rearmost points FP2 and BP2 of outer surface 129 which lie in plane HP2; horizontal plane HP3 may intersect hopper 26B (or 26A or 26C) sidewall 124 outer surface 129 at frontmost and rearmost points FP3 and BP3 of outer surface 129 which lie in plane HP3; and horizontal plane HP4 may intersect hopper 26B (or 26A or 26C) sidewall 124 outer surface 129 at frontmost and rearmost points FP4 and BP4 of outer surface 129 which lie in plane HP4. Frontmost points FP1-FP4 may be adjacent inner perimeter 172 frontmost point 182, and frontmost points FP2 and FP3 may be closely adjacent or in contact with inner perimeter 172 frontmost point 182. Frontmost points FP1-FP4 may be adjacent, closely adjacent or in contact with weld 218 frontmost portion 220. Rearmost points BP1-BP4 may be adjacent inner perimeter 172 rearmost point 184, and rearmost points BP2 and BP3 may be closely adjacent or in contact with inner perimeter 172 rearmost point 184. Rearmost points FP1-FP4 may be adjacent, closely adjacent or in contact with weld 218 rearmost portion 222. For a given hopper 26 and flange 146, frontmost points FP1-FP4, frontmost end/edge 156, front edge segment 174 and frontmost point 182 may be spaced forward of vertical axis C and the front side 135 of bottom edge 128 and exit opening 130. For a given hopper 26 and flange 146, rearmost points BP1-BP4, rearmost end/edge 158, rear edge segment 176 and rearmost point 184 may be spaced rearward of vertical axis C and the rear side 137 of bottom edge 128 and exit opening 130. For a given hopper 26, as viewed from the side (FIG. 10), edge 128/opening 130 and frontmost point 135, rearmost point 137, leftmost point 139 and rightmost point 141 are entirely between each of frontmost points FP1-FP4 and rearmost points BP1-BP4; and thus entirely rearward of frontmost points FP1-FP4; and entirely forward of rearmost points BP1-BP4.

As shown in FIG. 11, horizontal plane HP1 may intersect hopper 26B (or 26A or 26C) sidewall 124 outer surface 129 at leftmost and rightmost points LP1 and RP1 of outer surface 129 which lie in plane HP1; horizontal plane HP2 may intersect hopper 26B (or 26A or 26C) sidewall 124 outer surface 129 at leftmost and rightmost points LP2 and RP2 of outer surface 129 which lie in plane HP2; horizontal plane HP3 may intersect hopper 26B (or 26A or 26C) sidewall 124 outer surface 129 at leftmost and rightmost points LP3 and RP3 of outer surface 129 which lie in plane HP3; and horizontal plane HP4 may intersect hopper 26B (or 26A or 26C) sidewall 124 outer surface 129 at leftmost and rightmost points LP4 and RP4 of outer surface 129 which lie in plane HP4. Leftmost points LP1-LP4 may be adjacent inner perimeter 172 leftmost point 186, and leftmost points LP2 and LP3 may be closely adjacent or in contact with inner perimeter 172 leftmost point 186. Leftmost points FP1-FP4 may be adjacent, closely adjacent or in contact with weld 218 leftmost portion 224. Rightmost points RP1-RP4 may be adjacent inner perimeter 172 rightmost point 188, and rightmost points RP2 and RP3 may be closely adjacent or in contact with inner perimeter 172 rightmost point 188. Rightmost points RP1-RP4 may be adjacent, closely adjacent or in contact with weld 218 rightmost portion 226. Leftmost points LP1-LP4, leftmost end/edge 160, left edge segment 178 and leftmost point 186 may be spaced to the left of central plane CL, vertical axis C and the left side 139 of bottom edge 128 and exit opening 130. Rightmost points RP1-RP4, rightmost end/edge 162, right edge segment 180 and rightmost point 188 may be spaced to right of central plane CL, vertical axis C and the right side 141 of bottom edge 128 and exit opening 130. For a given hopper 26, as viewed from the rear (FIG. 11), edge 128/opening 130 and frontmost point 135, rearmost point 137, leftmost point 139 and rightmost point 141 are entirely between each of leftmost points LP1-LP4 and rightmost points RP1-RP4; and thus entirely rightward of leftmost points LP1-LP4; and entirely leftward of rightmost points RP1-RP4.

This paragraph provides some relationships between a given tension bar 148 and the two adjacent hoppers 26 and/or two adjacent flanges 146 between which the given tension bar extends. These two hoppers or pair of hoppers may be referred to in this paragraph as a forward hopper and a rearward hopper, which for instance, may represent respectively hoppers 26A and 26B or respectively hoppers 26B and 26C. These two flanges or pair of flanges may be referred to in this paragraph as a forward flange and a rearward flange, which for instance, may represent respectively flanges 146A and 146B or respectively flanges 146B and 146C. Each tension bar 148 including ends 206 and 208, surfaces 210 and 212 and edges/sides 214 and 216 may be, as viewed from the side (FIGS. 9-10), entirely between the inner perimeter frontmost point 182 of the rearward flange 146 and the inner perimeter rearmost point 184 of the forward flange 146, entirely between weld 218 frontmost portion 220 along the rearward hopper and flange and weld 218 rearmost portion 222 along the forward hopper and flange, entirely between each of frontmost points FP1-FP4 of the rearward hopper and each of rearmost points BP1-BP4 of the forward hopper, and entirely between the front side 135 of the bottom edge 128 and exit opening 130 of the rearward hopper and the back side 137 of the bottom edge 128 and exit opening 130 of the forward hopper; and thus entirely forward of the inner perimeter frontmost point 182 of the rearward flange 146, weld 218 frontmost portion 220 along the rearward hopper and flange, frontmost points FP1-FP4 of the rearward hopper, and the front side 135 of the bottom edge 128 and exit opening 130 of the rearward hopper; and entirely rearward of the inner perimeter rearmost point 184 of the forward flange 146, weld 218 rearmost portion 222 along the forward hopper and flange, rearmost points BP1-BP4 of the forward hopper, and the back side 137 of the bottom edge 128 and exit opening 130 of the forward hopper. Tension bar 148 forward and rearward of the back edge segment 132 of the forward hopper, the front edge segment 134 of the rearward hopper, the rib 23 between or along said back and front edge segments 132 and 134, and the welds 136 along said rib 23; thus, a front portion of tension bar 148 including front end 206 may be forward of said back edge segment 132, front edge segment 134, rib 23 and welds 136; and a rear portion of tension bar 148 including back end 208 may be rearward of said back edge segment 132, front edge segment 134, rib 23 and welds 136.

Each tension bar 148 including ends 206 and 208, surfaces 210 and 212 and edges/sides 214 and 216 may be, as viewed from the rear (FIG. 11) or front, entirely between leftmost end/edge 160 and rightmost end/edge 162, entirely between left edge segment 178 and right edge segment 180, entirely between leftmost point 186 and rightmost point 188, entirely between leftmost portion 224 and rightmost portion 226, entirely between each of leftmost points LP1-LP4 and each of rightmost points RP1-RP4, entirely between left and right sides 139 and 141 of bottom edge 128 and exit opening 130; and thus entirely to the right of leftmost end/edge 160, left edge segment 178, leftmost point 186, leftmost portion 224, leftmost points LP1-LP4, and left side 139 of bottom edge 128 and exit opening 130; and entirely to the left of rightmost end/edge 162, right edge segment 180, rightmost point 188, rightmost portion 226, rightmost points RP1-RP4 and right side 141 of bottom edge 128 and exit opening 130.

Figure 12:
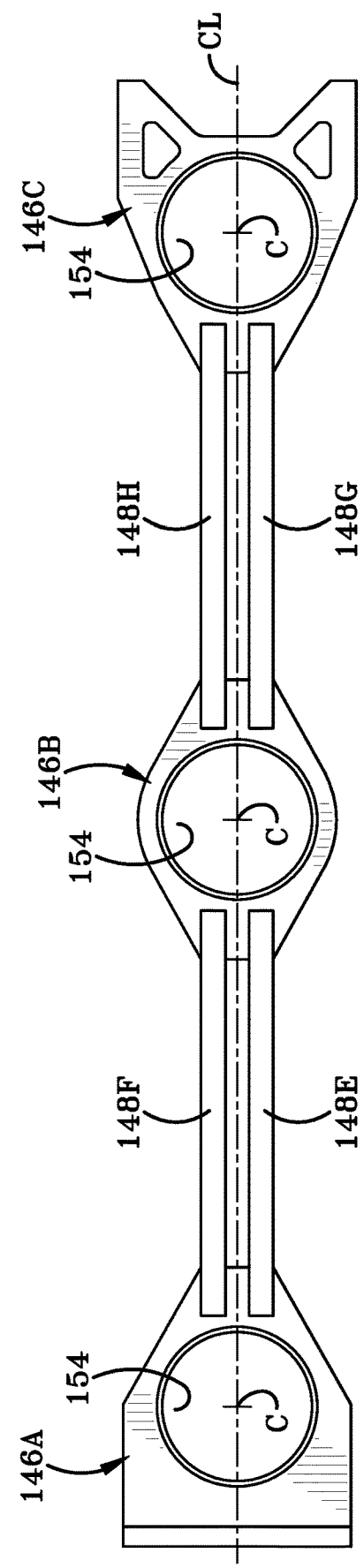
FIG. 12 is a top plan view of an alternate tension bar assembly showing tension bars which are axially offset from one another.

FIG. 12 illustrates an alternate tension bar assembly similar to tension bar assembly 38 showing front left and right tension bars extending between flanges 146A and 146B, and rear left and right tension bars extending between flanges 146B and 146C. The front left and right tension bars are axially spaced from one another so that the right edge of the front left bar and the left edge of the front right bar are spaced from one another and define therebetween a through space as viewed from above or below. Likewise, the rear left and right tension bars are axially spaced from one another so that the right edge of the rear left bar and the left edge of the rear right bar are spaced from one another and define therebetween a through space as viewed from above or below. Each of the front and rear left bars may be entirely to the left of and adjacent central plane CL, whereas each of the front and rear right bars may be entirely to the right of and adjacent central plane CL, whereby plane CL may not intersect any of the tension bars of the alternate tension bar assembly.

It is noted that various components or terms having the same names described herein may be denoted as additional or other components, or first, second, third and fourth components, etc. For instance, various hoppers may be denoted as an additional hopper or other hopper or first, second, third, fourth (etc) hoppers, and so forth. Other such components or terms may include, without limitation, housings, slide plate assemblies, tension bar assemblies, tension bars, flanges, plates, holes, portions, sections, wheels, walls, sidewalls, openings, intersections, ends, edges, edge segments, surfaces, peaks, bases, welds and so forth.

While various aspects of the trailer have been described above, similar or different aspects may be described below in a similar or different manner. Trailer 1 may include a trailer front end and a trailer back end defining therebetween a longitudinal direction; a first hopper; a second hopper which is rearward of the first hopper; and a tension bar assembly which extends between and is secured to the first and second hoppers, and which comprises a longitudinally elongated first tension bar extending from adjacent the first hopper to adjacent the second hopper. It may be the tension bar assembly comprises a first flange which is secured to and extends outward from the first hopper and which has a first flange rear end; the tension bar assembly comprises a second flange which is secured to and extends outward from the second hopper and which has a second flange front end which is rearward of the first flange rear end; and the first tension bar extends between and is secured to the first and second flanges. It may be that the trailer does not include or is free of a rigid structure which is secured to the first tension bar, which extends upward from the first tension bar rearward of the first flange rear end and forward of the second flange front end, and which is secured to the first or second hopper. It may be that the trailer does not include or is free of a metal structure which is secured to the first tension bar, which extends upward from the first tension bar rearward of the first flange rear end and forward of the second flange front end, and which is secured to the first or second hopper by a weld. It may be that the first hopper has a first hopper sidewall having a first hopper sidewall outer surface; the second hopper has a second hopper sidewall having a second hopper sidewall outer surface; and at least one of (a) the first flange is entirely directly below the first hopper sidewall outer surface, and (b) the second flange is entirely directly below the second hopper sidewall outer surface. It may be that the first hopper has a first hopper back end; the second hopper has a second hopper front end closely adjacent or in contact with the back end of the first hopper; the first flange is entirely forward of the first hopper back end and second hopper front end; and the second flange is entirely rearward of the first hopper back end and second hopper front end. It may be that the first flange has left and right sides defining therebetween a first width; the second flange has left and right sides defining therebetween a second width; and the first tension bar has left and right sides defining therebetween a third width which is less than each of the first and second widths. It may be that, other than the first and second flanges and any fastener which secures the first tension bar to the first and second flanges, the trailer is free of a rigid structure which is secured to and extends upward from the first tension bar and which is secured to the first or second hopper or the outer surfaces of the first and second hoppers. It may be that the first flange has an inner perimeter which defines a through hole; the first hopper extends through the through hole; the inner perimeter has leftmost and rightmost points; and as viewed from the rear, the first tension bar is entirely to the right of the leftmost point and entirely to the left of the rightmost point. It may be that the first flange defines a through hole having leftmost and rightmost points; the first hopper extends through the through hole; and as viewed from the rear, the first tension bar is entirely to the right of the leftmost point and entirely to the left of the rightmost point. It may be that the first hopper has a bottom edge defining a bottom exit opening having leftmost and rightmost points; and as viewed from the rear, the first tension bar is entirely to the right of the leftmost point and entirely to the left of the rightmost point. It may be that the trailer has left and right sides; the first hopper has a first hopper sidewall having a first hopper sidewall outer surface having a rear base; the second hopper has a second hopper sidewall having a second hopper sidewall outer surface having a front base; and a through opening extends from the left side of the trailer to the right side of the trailer above a top of the tension bar assembly and below the rear and front bases. It may be that the trailer has a left trailer half to the left of an imaginary central vertical plane and a right trailer half to the right of the central vertical plane; the first tension bar is intersected by the central vertical plane; the first tension bar extends from the central plane to the left a normal distance of no more than 1, 2, 3, 4, 5 or 6 inches; and the first tension bar extends from the central plane to the left a normal distance of no more than 1, 2, 3, 4, 5 or 6 inches. It may be that the first hopper defines a first bottom exit opening; the second hopper defines a second bottom exit opening; the first tension bar and the first and second exit openings are intersected by an imaginary vertical plane which extends in the longitudinal direction; the first tension bar extends from the plane to the left a normal distance of no more than 1, 2, 3, 4, 5 or 6 inches; and the first tension bar extends from the plane to the right a normal distance of no more than 1, 2, 3, 4, 5 or 6 inches. It may be that the first hopper has a first hopper sidewall having a first hopper sidewall top edge, a first hopper sidewall bottom edge and a first hopper sidewall outer surface; a rear base of the first hopper sidewall outer surface is defined at an intersection between an imaginary longitudinally extending vertical plane and a back of the first hopper sidewall outer surface from the first hopper sidewall top edge to the first hopper sidewall bottom edge; the second hopper has a second hopper sidewall having a second hopper sidewall top edge, a second hopper sidewall bottom edge and a second hopper sidewall outer surface; a front base of the second hopper sidewall outer surface is defined at an intersection between the vertical plane and a front of the second hopper sidewall outer surface from the second hopper sidewall top edge to the second hopper sidewall bottom edge; and as viewed from the side, the first tension bar has a front end which is adjacent and spaced rearward from the rear base and a back end which is adjacent and spaced forward from the front base. It may be that the trailer includes a third hopper which is rearward of the second hopper; wherein the tension bar assembly extends between and is secured to the second and third hoppers, and comprises a longitudinally elongated second tension bar extending from adjacent the second hopper to adjacent the third hopper.

It may also be that trailer 1 includes a first hopper; a second hopper which is rearward of the first hopper; a third hopper which is rearward of the second hopper; a first flange which is secured to and extends outward from the first hopper; a second flange which is secured to and extends outward from the second hopper; a third flange which is secured to and extends outward from the third hopper; a first tension bar extending between and secured to first and second flanges; and a second tension bar extending between and secured to second and third flanges. It may be that trailer 1 includes a front end housing extending forward of the first hopper and having a lower portion; a front frame secured to the lower portion of the front end housing; a hitch member secured to the front frame; a rear end housing extending rearward of the third hopper and having a lower portion; a rear frame secured to the lower portion of the rear end housing; and a plurality of ground engaging wheels rotatably mounted on the rear frame; wherein the first flange is secured to the front frame; and the third flange is secured to the rear frame. It may also be that trailer 1 includes a front end housing extending forward of the first hopper and having a lower portion; a front frame secured to the lower portion of the front end housing; and landing gear secured to the front frame; wherein the first hopper is a frontmost hopper and defines a bottom exit opening; and the landing gear is forward of the bottom exit opening.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration is an example and is not limited to the exact details shown or described.

The invention claimed is:

1. A tank trailer comprising:
   a trailer front end and a trailer back end defining therebetween a longitudinal direction;
   a first hopper;
   a second hopper which is rearward of the first hopper; and
   a tension assembly which extends between and is secured to the first and second hoppers, and which comprises a first flange which is secured to and extends outward from the first hopper and which has a first flange rear end; a second flange which is secured to and extends outward from the second hopper and which has a second flange front end which is rearward of the first flange rear end; and a longitudinally elongated first tension member secured to and extending between the first and second flanges and adjacent the first hopper to adjacent the second hopper; and
   wherein the trailer is free of a rigid structure which is secured to the first tension member, which extends upward from the first tension member rearward of the first flange rear end and forward of the second flange front end, and which is secured to the first or second hopper.

2. The tank trailer of claim 1 wherein the first hopper has a first hopper sidewall having a first hopper sidewall outer surface; the first tension member has a top or bottom surface which lies in an imaginary horizontal plane which intersects the first hopper sidewall outer surface at leftmost and rightmost points of first hopper sidewall outer surface which lie in the horizontal plane; and as viewed from the rear, the first tension member has a left side to the right of the leftmost point and a right side to the left of the rightmost point.

3. The tank trailer of claim 1 wherein the first hopper has a first hopper sidewall having a first hopper sidewall outer surface; the second hopper has a second hopper sidewall having a second hopper sidewall outer surface; and at least one of (a) the first flange is entirely directly below the first hopper sidewall outer surface, and (b) the second flange is entirely directly below the second hopper sidewall outer surface.

4. The tank trailer of claim 1 wherein the first hopper has a first hopper back end; the second hopper has a second hopper front end closely adjacent or in contact with the back end of the first hopper; the first flange is entirely forward of the first hopper back end and second hopper front end; and the second flange is entirely rearward of the first hopper back end and second hopper front end.

5. The tank trailer of claim 1 wherein the first flange has left and right sides defining therebetween a first width; the second flange has left and right sides defining therebetween a second width; and the first tension member has left and right sides defining therebetween a third width which is less than each of the first and second widths.

6. The tank trailer of claim 1 wherein, other than the first and second flanges and any fastener which secures the first tension member to the first and second flanges, the trailer is free of a rigid structure which is secured to and extends upward from the first tension member and which is secured to the first or second hopper.

7. The tank trailer of claim 1 wherein the first flange has an inner perimeter which defines a through hole; the first hopper extends through the through hole; the inner perimeter has leftmost and rightmost points; and as viewed from the rear, the first tension member is entirely to the right of the leftmost point and entirely to the left of the rightmost point.

8. The tank trailer of claim 1 wherein the first flange defines a through hole having leftmost and rightmost points; the first hopper extends through the through hole; and as viewed from the rear, the first tension member is entirely to the right of the leftmost point and entirely to the left of the rightmost point.

9. The tank trailer of claim 1 wherein the first hopper has a bottom edge defining a bottom exit opening having leftmost and rightmost points; and as viewed from the rear, the first tension member is entirely to the right of the leftmost point and entirely to the left of the rightmost point.

10. The tank trailer of claim 1 wherein the trailer has left and right sides;
    the first hopper has a first hopper sidewall having a first hopper sidewall outer surface having a rear base; the second hopper has a second hopper sidewall having a second hopper sidewall outer surface having a front base; and a through opening extends from the left side of the trailer to the right side of the trailer above a top of the tension assembly and below the rear and front bases.

11. The tank trailer of claim 1 wherein the first hopper has a first hopper sidewall having a first hopper sidewall top edge, a first hopper sidewall bottom edge and a first hopper sidewall outer surface;

a rear base of the first hopper sidewall outer surface is defined at an intersection between an imaginary longitudinally extending vertical plane and a back of the first hopper sidewall outer surface from the first hopper sidewall top edge to the first hopper sidewall bottom edge;

the second hopper has a second hopper sidewall having a second hopper sidewall top edge, a second hopper sidewall bottom edge and a second hopper sidewall outer surface;

a front base of the second hopper sidewall outer surface is defined at an intersection between the vertical plane and a front of the second hopper sidewall outer surface from the second hopper sidewall top edge to the second hopper sidewall bottom edge; and as viewed from the side, the first tension member has a front end which is adjacent and spaced rearward from the rear base and a back end which is adjacent and spaced forward from the front base.

12. The tank trailer of claim 1 further comprising a third hopper which is rearward of the second hopper; wherein the tension assembly extends between and is secured to the second and third hoppers, and comprises a longitudinally elongated second tension member extending from adjacent the second hopper to adjacent the third hopper.

13. A tank trailer comprising:
a first hopper;
a second hopper which is rearward of the first hopper;
a third hopper which is rearward of the second hopper;
a first flange which is secured to and extends outward from the first hopper;
a second flange which is secured to and extends outward from the second hopper;
a third flange which is secured to and extends outward from the third hopper;
a first tension member extending between and secured to first and second flanges; and
a second tension member extending between and secured to second and third flanges; and wherein the trailer is free of a rigid structure which is secured to the first tension member, which extends upward from the first tension member rearward of the first flange and forward of the second flange, and which is secured to the first or second hopper and wherein the trailer is free of a rigid structure which is secured to the second tension member, which extends upward from the second tension member rearward of the second flange and forward of the third flange, and which is secured to the second or third hopper.

14. The tank trailer of claim 13 further comprising:
a front end housing extending forward of the first hopper and having a lower portion;
a front frame secured to the lower portion of the front end housing;
a hitch member secured to the front frame;
a rear end housing extending rearward of the third hopper and having a lower portion;
a rear frame secured to the lower portion of the rear end housing; and
a plurality of ground engaging wheels rotatably mounted on the rear frame;
wherein the first flange is secured to the front frame; and
the third flange is secured to the rear frame.

15. The tank trailer of claim 13 further comprising
a front end housing extending forward of the first hopper and having a lower portion;
a front frame secured to the lower portion of the front end housing; and
landing gear secured to the front frame;
wherein the first hopper is a frontmost hopper and defines a bottom exit opening; and
the landing gear is forward of the bottom exit opening.

16. The tank trailer of claim 13 wherein the first tension member is a first tension bar; and the second tension member is a second tension bar.

* * * * *